(12) United States Patent
Sarir et al.

(10) Patent No.: US 10,978,063 B2
(45) Date of Patent: *Apr. 13, 2021

(54) SYSTEMS, DEVICES AND METHODS FOR DELIVERING AUDIBLE ALERTS

(71) Applicant: The Toronto-Dominion Bank, Toronto (CA)

(72) Inventors: Nasim Sarir, Thornhill (CA); Steven Gervais, Newmarket (CA); Peter Horvath, Toronto (CA); Ekas Kaur Rai, Brampton (CA); Peter John Alexander, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 100 days.

This patent is subject to a terminal disclaimer.

(21) Appl. No.: 16/144,868

(22) Filed: Sep. 27, 2018

(65) Prior Publication Data
US 2020/0105254 A1    Apr. 2, 2020

(51) Int. Cl.
*G10L 15/22* (2006.01)
*H04L 29/08* (2006.01)
*H04W 4/20* (2018.01)

(52) U.S. Cl.
CPC .............. *G10L 15/22* (2013.01); *H04L 67/24* (2013.01); *H04L 67/26* (2013.01); *H04W 4/20* (2013.01)

(58) Field of Classification Search
None
See application file for complete search history.

(56) References Cited

U.S. PATENT DOCUMENTS

| 6,023,684 A | 2/2000 | Pearson |
| 6,907,277 B1 | 6/2005 | Shim |

(Continued)

FOREIGN PATENT DOCUMENTS

| WO | 2001043338 | 6/2001 |
| WO | WO2015106230 A1 | 7/2015 |
| WO | WO2017213938 A1 | 12/2017 |

OTHER PUBLICATIONS

Huan Feng, Kassem Fawaz, and Kang G. Shin., Continuous authentication for voice assistants, Proceedings of the 23rd Annual International Conference on Mobile Computing and Networking (MobiCom '17), ACM p. 343-355; Oct. 16-20, 2017.

(Continued)

*Primary Examiner* — Jonathan C Kim
(74) *Attorney, Agent, or Firm* — Ridout and Maybee LLP

(57) ABSTRACT

Systems, devices and methods for delivering audible alerts are described. In one aspect, an event for generating an audible alert for a user is detected. In response to detection of the event for generating the audible alert, it is determined whether an authorized audible interface device is within a threshold distance of the user based on a location of the user and a location of one or more authorized audible interface devices. In response to determining that an audible interface device is within the threshold distance of the user, alert instructions for the audible interface device are generated. The alert instructions cause the audible interface device to generate the audible alert in accordance with alert data provided in the alert instructions. The alert instructions are sent to the audible interface device over a wireless network via a communication module.

19 Claims, 10 Drawing Sheets

(56) References Cited

U.S. PATENT DOCUMENTS

| | | | |
|---|---|---|---|
| 7,130,388 B1* | 10/2006 | Bell | H04M 3/537 379/88.12 |
| 7,191,233 B2 | 3/2007 | Miller | |
| 7,904,067 B1* | 3/2011 | Tiwari | H04M 3/42153 455/415 |
| 8,213,962 B2 | 7/2012 | Carr | |
| 8,233,943 B1* | 7/2012 | Othmer | H04M 1/72563 455/567 |
| 8,428,621 B2 | 4/2013 | Vorbau | |
| 8,527,763 B2 | 9/2013 | Seibert | |
| 8,554,849 B2 | 10/2013 | Heikes | |
| 8,738,723 B1* | 5/2014 | Faaborg | H04L 67/22 709/207 |
| 8,823,507 B1* | 9/2014 | Touloumtzis | G08B 23/00 340/501 |
| 8,848,879 B1* | 9/2014 | Coughlan | H04M 1/57 379/88.12 |
| 9,082,271 B2* | 7/2015 | Ramaswamy | H04M 1/72552 |
| 9,734,301 B2 | 8/2017 | King | |
| 9,798,512 B1 | 10/2017 | Faaborg | |
| 9,824,582 B2 | 11/2017 | Lopez-Hinojosa | |
| 10,140,845 B1* | 11/2018 | Knas | G08B 25/10 |
| 10,242,673 B2* | 3/2019 | Campbell | G10L 15/16 |
| 2001/0056401 A1 | 12/2001 | Tompkins | |
| 2004/0183749 A1* | 9/2004 | Vertegaal | G06F 3/013 345/7 |
| 2005/0258938 A1* | 11/2005 | Moulson | H04M 3/02 340/7.58 |
| 2008/0039021 A1* | 2/2008 | Fux | H04M 19/04 455/67.7 |
| 2008/0139178 A1* | 6/2008 | Kawasaki | H04M 1/6075 455/413 |
| 2010/0202622 A1 | 8/2010 | Hardee | |
| 2010/0205667 A1* | 8/2010 | Anderson | G06F 3/017 726/19 |
| 2012/0078623 A1* | 3/2012 | Vertegaal | G05B 23/02 704/231 |
| 2013/0278492 A1 | 10/2013 | Stolarz et al. | |
| 2013/0324081 A1* | 12/2013 | Gargi | H04W 12/08 455/411 |
| 2014/0026105 A1* | 1/2014 | Eriksson | G06F 3/04883 715/863 |
| 2014/0062697 A1* | 3/2014 | Ramaswamy | H04M 19/04 340/540 |
| 2014/0146959 A1 | 5/2014 | Spence | |
| 2014/0207469 A1* | 7/2014 | Dykstra-Erickson | G06F 1/3287 704/275 |
| 2015/0088746 A1 | 3/2015 | Hoffman | |
| 2015/0223200 A1* | 8/2015 | Kim | H04W 4/16 455/458 |
| 2015/0347075 A1* | 12/2015 | Levesque | G06F 3/016 345/3.1 |
| 2016/0028584 A1* | 1/2016 | Lee | H04L 65/1073 709/226 |
| 2016/0080537 A1* | 3/2016 | Kim | H03G 7/002 455/550.1 |
| 2016/0148496 A1* | 5/2016 | Meredith | H04W 4/02 340/286.07 |
| 2016/0179455 A1* | 6/2016 | Liu | G06F 3/1454 345/2.2 |
| 2016/0261532 A1* | 9/2016 | Garbin | H04L 51/12 |
| 2016/0343034 A1 | 11/2016 | Green et al. | |
| 2016/0350553 A1* | 12/2016 | Alameh | G06F 21/6245 |
| 2016/0381205 A1* | 12/2016 | You | H04W 4/027 455/418 |
| 2017/0083282 A1* | 3/2017 | Tsunoda | G06F 3/165 |
| 2017/0127226 A1* | 5/2017 | Allen | G08B 21/24 |
| 2017/0148307 A1* | 5/2017 | Yeom | G06F 21/316 |
| 2017/0156042 A1* | 6/2017 | Kwan | H04W 76/14 |
| 2017/0193530 A1* | 7/2017 | Newsum | H04W 4/021 |
| 2017/0273051 A1* | 9/2017 | Robinson | H04W 4/80 |
| 2017/0316320 A1* | 11/2017 | Jamjoom | H04L 51/24 |
| 2017/0358296 A1* | 12/2017 | Segalis | G10L 15/222 |
| 2018/0077648 A1* | 3/2018 | Nguyen | H04W 4/021 |
| 2018/0206083 A1* | 7/2018 | Kumar | H04W 4/021 |
| 2018/0260782 A1* | 9/2018 | Bay | H04L 51/36 |
| 2018/0310159 A1* | 10/2018 | Katz | H04M 3/4217 |
| 2018/0359207 A1* | 12/2018 | Chatterjee | H04L 51/12 |
| 2019/0012444 A1* | 1/2019 | Lesso | G06F 3/165 |
| 2019/0050195 A1* | 2/2019 | Knox | G06K 9/00604 |
| 2019/0124049 A1* | 4/2019 | Bradley | H04L 63/164 |
| 2019/0165937 A1* | 5/2019 | Funane | G06F 21/32 |
| 2019/0310820 A1* | 10/2019 | Bates | H04N 21/4532 |
| 2020/0105254 A1* | 4/2020 | Sarir | H04W 4/02 |

OTHER PUBLICATIONS

Martin Arnold and Hugo Greenhalgh, Banking biometrics: Best of Money: hacking into your account is easier than you think, Financial Times, https://www.ft.com/content/959b64fe-9f66-11e6-891e-abe238dee8e2 Nov. 4, 2016.

Notice of Allowance; U.S. Appl. No. 16/003,691 dated Mar. 23, 2020.

Office Action; U.S. Appl. No. 16/144,894 dated Apr. 28, 2020.

Advisory Action; U.S. Appl. No. 16/144,894 dated Nov. 25, 2020.

Notice of Allowance; U.S. Appl. No. 16/144,752 dated Jul. 15, 2020.

Final Rejection; U.S. Appl. No. 16/144,894 dated Sep. 14 2020.

* cited by examiner

SYSTEMS, DEVICES AND METHODS FOR DELIVERING AUDIBLE ALERTS

TECHNICAL FIELD

The present disclosure relates to audible interfaces, including interfaces for use with voice-based virtual assistants, and in particular to systems, devices and methods for delivering audible alerts.

BACKGROUND

Voice-based virtual assistants (also referred to simply as voice assistants) are software applications that use voice recognition to receive, interpret and execute audible commands (e.g., voice commands). Voice assistants may be provided by a mobile wireless communication device such as a smartphone, desktop or laptop computer, smart device (such as a smart speaker) or similar internet-of-things (IoT) device.

A drawback of voice assistants is that such systems may not be kept close to the user at all times. This may be particularly the case where the voice assistant is a primarily audible device that provides an audible interface (such as a smart speaker). Further, a user may have more than one voice assistant device authorized for use with a particular application or service. Further still, at least some of the voice assistants may be located in a shared environment at least some of the time and the user may wish to use voice assistants for communicating private data. It would be desirable to provide a solution that enables the delivery of audible alerts to a user on a voice assistant in a manner which takes into account one or more of these situations.

DESCRIPTION OF EXAMPLE EMBODIMENTS

Figure 1A:
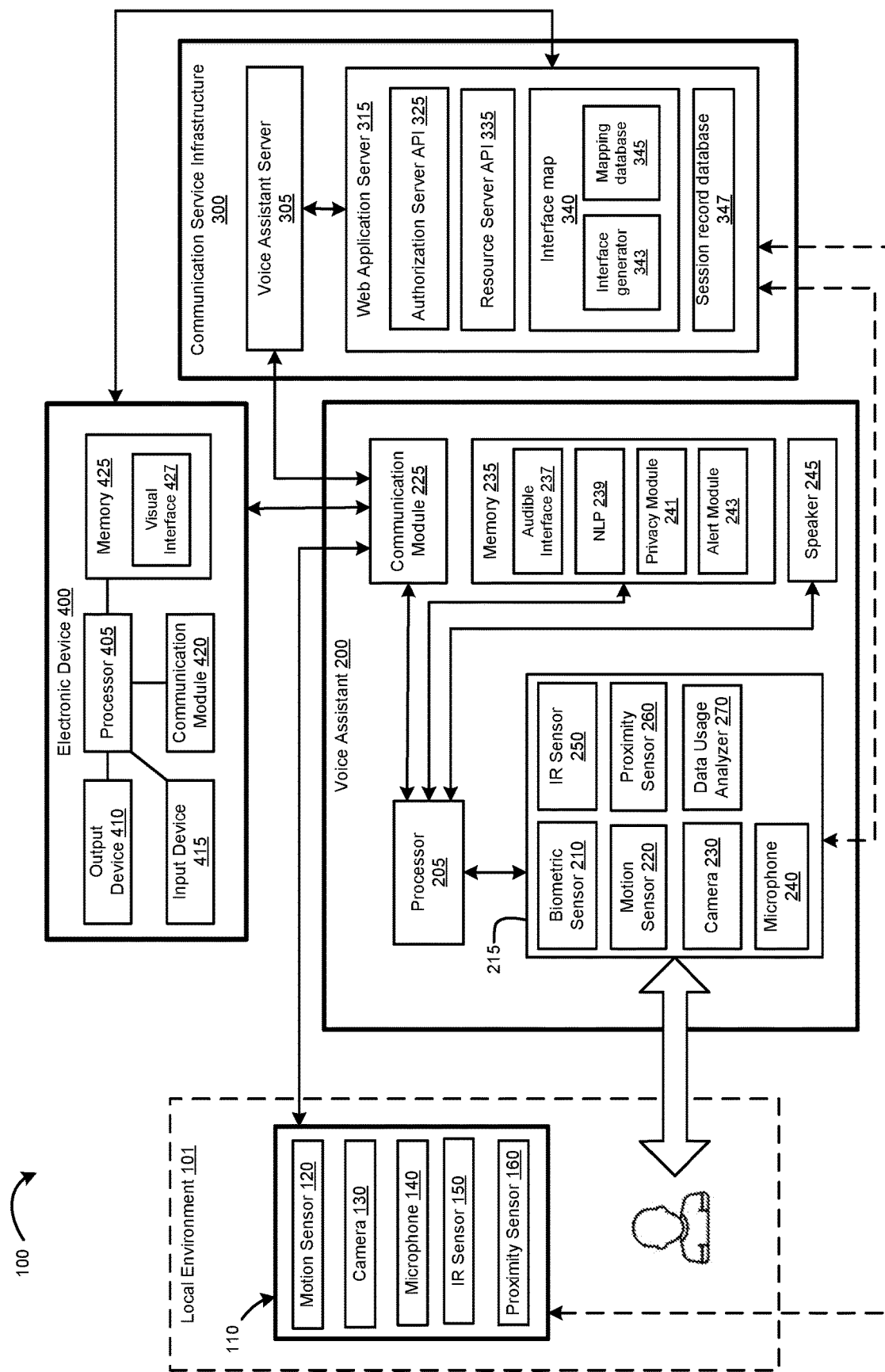
FIGS. 1A and 1B are schematic diagrams of a communication system in accordance with example embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium. Lastly, elements referred to in the singular may be plural and vice versa, except where indicated otherwise either explicitly or inherently by context.

In accordance with one aspect of a first embodiment of the present disclosure, there is provided a server, which may be a web application server. The server comprises: a processor; a communication module coupled to the processor for communication with a wireless network; a memory coupled to the processor, the memory having tangibly stored thereon executable instructions for execution by the processor, wherein the executable instructions, when executed by the processor, cause the server to: detect an event for generating an audible alert for a user; in response to detection of the event for generating the audible alert: determine whether an authorized audible interface device is within a threshold distance of the user based on a location of the user and a location of one or more authorized audible interface devices; in response to determining that an audible interface device is within the threshold distance of the user, generate alert instructions for the audible interface device, wherein the alert instructions cause the audible interface device to generate the audible alert in accordance with alert data provided in the alert instructions, and send the alert instructions to the audible interface device over the wireless network via the communication module.

In any of the above, the location of the user may be determined by determining a location associated with a personal electronic device of the user. The personal electronic device may be a wearable electronic device adapted to be worn or carried by the user.

In any of the above, the determining whether an authorized audible interface device is within the threshold distance of the user may be performed by querying a location service, the audible interface device, a personal electronic device of the user, or a proxy device which provides location information on behalf of the audible interface device or the personal electronic device of the user.

In any of the above, the determining whether an authorized audible interface device is within the threshold distance of the user may be performed by the server.

In any of the above, the alert instructions may cause the audible interface device to generate the audible alert until input dismissing or deferring the audible alert is received by the audible interface device.

In any of the above, the alert instructions may cause the audible interface device to: generate the audible alert; detect a command to defer to the generation of the audible alert; in response to detection of the command to defer to the generation of the audible alert, defer the generation of the audible alert for a predetermined duration.

In any of the above, one or more of a type, content or characteristics of the audible alert may depend on a characteristic of the event. The characteristic of the event may be a priority rating assigned to the event.

In any of the above, the event may be a data transfer, a change in a status of an account of the user, or receipt of an electronic message.

In any of the above, the characteristics of the audible alert may comprise one or more of audio characteristics or a notification frequency at which the alert is generated. The audio characteristics may comprise one or more of a pitch or amplitude, wherein events having a "high" priority rating may be associated with audible alerts having a high pitch, high amplitude, and high notification frequency until the event has ended.

In any of the above, the types of audible alerts may comprise verbal messages and non-verbal sounds.

In any of the above, the executable instructions, when executed by the processor, may further cause the server to: determine whether an environment of the audible interface device is private; in response to determining that the environment of the audible interface device is private, enable the server to generate an audible alert comprising a verbal message containing private data; and in response to determining that the environment of the audible interface device is non-private, disable the server from generating an audible alert comprising a verbal message containing private data. The audible alert may comprise a non-verbal sound when disabling the server from generating an audible alert comprising a verbal message containing private data. The audible alert may comprise a verbal message containing a predetermined phrase containing non-private data determined during generation of the alert instructions in dependence on the event when disabling the server from generating an audible alert comprising a verbal message containing private data.

The executable instructions to determine whether an environment of the audible interface device is private, when executed by the processor, may cause the server to: determine whether the environment of the audible interface device is private in real-time based on sensor data provided by the audible interface device. The executable instructions to determine whether an environment of the audible interface device is private, when executed by the processor, may cause the server to: determine whether the environment of the audible interface device is private based on a privacy rating for the audible interface device.

In any of the above, the alert instructions may be sent to an audible interface device closest to the user when more than one audible interface device is within the threshold distance of the user.

In any of the above, when the audible interface device comprises at least one light emitting diode (LED), the alert instructions may include instructions to generate a visual alert via the LED in accordance with the alert data provided in the alert instructions, wherein the visual alert comprises flashing the LED in a predetermined color and/or pattern in dependence on a characteristic of the event.

In any of the above, when the audible interface device comprises a display, the alert instructions may include instructions to generate a visual alert via the display in accordance with the alert data provided in the alert instructions, wherein the visual alert comprises displaying on the display an electronic message comprising the alert data of the audible alert, wherein the electronic message comprises a deep link to a resource corresponding to the audible alert.

In any of the above, the executable instructions, when executed by the processor, may further cause the server to: send an electronic message to a predetermined communication address, wherein the electronic message comprises the alert data of the audible alert.

In accordance with another aspect of the first embodiment of the present disclosure, there is provided a method of delivering audible alerts, comprising: detecting an event for generating an audible alert for a user; in response to detection of the event for generating the audible alert: determining whether an authorized audible interface device is within a threshold distance of the user based on a location of the user and a location of one or more authorized audible interface devices; in response to determining that an audible interface device is within the threshold distance of the user, generating alert instructions for the audible interface device, wherein the alert instructions cause the audible interface device to generate the audible alert in accordance with alert data provided in the alert instructions, and sending the alert instructions to the audible interface device over the wireless network via a communication module.

In accordance with one aspect of a second embodiment of the present disclosure, there is provided a server, which may be a web application server. The server, comprises: a processor; a communication module coupled to the processor for communication with a wireless network; a memory coupled to the processor, the memory having tangibly stored thereon executable instructions for execution by the processor, wherein the executable instructions, when executed by the processor, cause the server to: detect an event for generating an audible alert for a user; in response to detection of the event for generating the audible alert: determine one or more authorized audible interface devices for generating the audible alert having at least one of a privacy rating that matches a privacy rating of the event and a context setting that matches a priority rating of the detected event; generate alert instructions for the one or more authorized audible interface devices, wherein the alert instructions cause the one or more authorized audible interface devices to generate the audible alert in accordance with alert data provided in the alert instructions; and send the alert instructions to the one or more audible interface devices over the wireless network via the communication module.

In accordance with another aspect of the second embodiment of the present disclosure, there is provided a method of delivering audible alerts, comprising: detecting an event for generating an audible alert for a user; in response to detection of the event for generating the audible alert: determining one or more authorized audible interface devices for generating an audible alert having a privacy rating that matches and a privacy rating of the event and optionally a context setting that matches and a priority rating of the detected event; generating alert instructions for the one or more audible interface devices, wherein the alert instructions cause the one or more audible interface devices to generate the audible alert in accordance with alert data provided in the alert instructions; and sending the alert instructions to the one or more audible interface devices over the wireless network via the communication module.

In accordance with one aspect of a third embodiment of the present disclosure, there is provided a server, which may be a web application server. The server comprises: a processor; a communication module coupled to the processor for communication with a wireless network; a memory coupled to the processor, the memory having tangibly stored thereon executable instructions for execution by the processor, wherein the executable instructions, when executed by the processor, cause the server to: detect an event for generating an audible alert for a user; in response to detection of the event for generating the audible alert: select an audible interface device for delivery of the audible alert based on a location of a personal electronic device of the user; determine whether the selected audible interface device is shared; in response to determining that the selected audible interface device is shared, determine whether a personal electronic device of another user is within a threshold distance of the selected audible interface device; in response to determining that the personal electronic device of the another user is within the threshold distance of the selected audible interface device, determine an audible identifier associated with the user; generate alert instructions for the audible interface device; send the alert instructions to the audible interface device over the wireless network via the communication module, wherein the alert instructions cause the audible interface device to generate the audible alert in accordance with alert data provided in the alert instructions, wherein the generation of the audible alert is preceded by generation of the audible identifier associated with the user to notify the user of the forthcoming audible alert.

In any of the above, the audible identifier may be a non-verbal sound.

In any of the above, the audible identifier may be a verbal message in a form of a user indicator. The user indicator may be a user name of the user for whom the audible alert is directed.

In any of the above, the executable instructions to determine the audible identifier associated with the user, when executed by the processor, may further cause the server to: query a database to identify the audible identifier associated with the user, the database comprising a plurality of user-defined audible identifiers, one user-defined audible identifier for each user in a plurality of users; and retrieve the audible identifier associated with the user.

In any of the above, the location of the personal electronic device of each respective user authorized to use the selected audible interface device may be determined by querying a location service, the selected audible interface device, the personal electronic device of each respective user, or a proxy device which provides location information on behalf of the selected audible interface device or the personal electronic device of each respective user.

In any of the above, the location of the personal electronic device of each respective user authorized to use the selected audible interface device may be determined by the server.

In any of the above, each personal electronic device may be a wearable electronic device worn or carried by the respective user.

In any of the above, the executable instructions, when executed by the processor, may further cause the server to: in response to determining that the personal electronic device of the another user is within the threshold distance of the audible interface, disable the generation of an audible alert comprising a verbal message containing private data. When disabling the generation of the audible alert comprising the verbal message containing private data, the audible alert may comprise a non-verbal sound. When disabling the generation of the audible alert comprising the verbal message containing private data, the audible alert may comprise a verbal message containing a predetermined phrase containing non-private data determined during generation of the alert instructions in dependence on the event.

In any of the above, the executable instructions, when executed by the processor, may further cause the server to: in response to determining that the personal electronic device of the another user is within the threshold distance of the selected audible interface device: generate secondary alert instructions for the personal electronic device of the user; send the secondary alert instructions to the personal electronic device over the wireless network via the communication module, wherein the secondary alert instructions cause the personal electronic device to generate a secondary alert in accordance with alert data provided in the secondary alert instructions via a notification element of the personal electronic device. The notification element may comprise a vibrator and the secondary alert may comprise a vibration caused by the notification element. The notification element may comprise at least one light emitting diode (LED) and the secondary alert may comprise flashing of the LED. The notification element may comprise a display and the secondary alert may comprise displaying on the display an electronic message comprising the alert data of the audible alert. The electronic message may comprise a deep link to a resource corresponding to the audible alert.

In any of the above, one or more of a type, content or characteristics of the audible alert may depend on a characteristic of the event. The characteristic of the event may include a priority rating assigned to the event.

In accordance with another aspect of the third embodiment of the present disclosure, there is provided a method of delivering audible alerts, comprising: detecting an event for generating an audible alert for a user; in response to detection of the event for generating the audible alert: selecting an audible interface device for delivery of the audible alert based on a location of a personal electronic device of the user; determining whether the selected audible interface device is shared; in response to determining that the selected audible interface device is shared, determining whether a personal electronic device of another user is within a threshold distance of the selected audible interface device; in response to determining that the personal electronic device of the another user is within the threshold distance of the selected audible interface device, determining an audible identifier associated with the user; generating alert instructions for the audible interface device; sending the alert instructions to the audible interface device over the wireless network via the communication module, wherein the alert instructions cause the audible interface device to generate the audible alert in accordance with alert data provided in the alert instructions, wherein the generation of the audible alert is preceded by generation of the audible identifier associated with the user to notify the user of the forthcoming audible alert.

In accordance with one aspect of a fourth embodiment of the present disclosure, there is provided a server, which may be a web application server. The server comprise: a processor; a communication module coupled to the processor for communication with a wireless network; a memory coupled to the processor, the memory having tangibly stored thereon executable instructions for execution by the processor, wherein the executable instructions, when executed by the processor, cause the server to: detect an event for generating an audible alert for a user; in response to detection of the event for generating the audible alert:
select an audible interface device for delivery of the audible alert based on a location of a personal electronic device of the user; determine whether a personal electronic device of another user is within a threshold distance of the selected audible interface device; in response to determining that the personal electronic device of the another user is within the threshold distance of the selected audible interface device: determine an audible identifier associated with the user; generate alert instructions for the audible interface device; send the alert instructions to the audible interface device over the wireless network via the communication module, wherein the alert instructions cause the audible interface device to generate the audible alert in accordance with alert data provided in the alert instructions, wherein the generation of the audible alert is preceded by generation of the audible identifier associated with the user to notify the user of the forthcoming audible alert.

In accordance with one aspect of a fifth embodiment of the present disclosure, there is provided a server, which may be a web application server. The server comprising: a processor; a communication module coupled to the processor for communication with a wireless network; a memory coupled to the processor, the memory having tangibly stored thereon executable instructions for execution by the processor, wherein the executable instructions, when executed by the processor, cause the server to: detect an event for generating an audible alert for a user; in response to detection of the event for generating the audible alert: select an audible interface device for delivery of the audible alert based on a location of a personal electronic device of the user; generate alert instructions for the audible interface device; determine whether a personal electronic device of another user is within a threshold distance of the selected audible interface device; in response to determining that the personal electronic device of the another user is within the threshold distance of the selected audible interface device, generate secondary alert instructions for the personal electronic device of the user; send the alert instructions to the audible interface device over the wireless network via the communication module, wherein the alert instructions cause the audible interface device to generate the audible alert in accordance with alert data provided in the alert instructions; send the secondary alert instructions to the personal electronic device over the wireless network via the communication module contemporaneously with sending the alert instructions to the audible alert device, wherein the secondary alert instructions cause the personal electronic device to generate a secondary alert in accordance with alert data provided in the secondary alert instructions via a notification element of the personal electronic device.

In accordance with further aspects of the present disclosure, there is provided an audible interface device, comprising: a processor; a communication module coupled to the processor; one or more speakers coupled to the processor; one or more microphones coupled to the processor; a memory coupled to the processor, the memory having tangibly stored thereon executable instructions for execution by the processor, wherein the executable instructions, when executed by the processor, cause the server to: receive alert instructions to generate an audible alert in accordance with alert data provided in the alert instructions; generate the audible alert. The audible alert is generated in accordance with the audio characteristics and/or a notification frequency defined by the alert instructions.

In accordance with yet further aspects of the present disclosure, there is provided a non-transitory machine readable medium having tangibly stored thereon executable instructions for execution by a processor, such as a processor of a server that is in network communication with an audible interface device, or a processor of an audible interface device. The executable instructions, when executed by the processor, cause the server or the voice assistant device to perform one or more of the methods described above and herein.

Communication System

Reference is first made to FIG. 1A which shows in schematic block diagram form a communication system 100 in accordance with one example embodiment of the present disclosure. The communication system 100 includes a voice assistant device 200, one or more sensors 110 located in a local environment 101 in the vicinity of the voice assistant device 200, one or more other electronic devices 400, and a communication service infrastructure 300. The voice assistant device 200 is an electronic device that may be a wireless communication device such as a smartphone, desktop or laptop computer, smart device (such as a smart speaker) or similar IoT device. The voice assistant device 200 may function as a voice-based virtual assistant (also referred to simply as a voice assistant). In various embodiments described herein, the voice assistant device 200 may be a primarily audible device, which receives audio input (e.g., voice commands from a user) and outputs audio output (e.g., from a speaker) and which does not make use of a visual interface. In various embodiments described herein, the voice assistant device 200 may be designed to be placed in the local environment 101, and may not be intended to be carried with the user.

The one or more sensors 110 may include a motion sensor 120, a camera 130, a microphone 140, an infrared (IR) sensor 150, and/or a proximity sensor 160, and/or combinations thereof. The one or more sensors 110 are communicatively coupled to the voice assistant device 200 via wireless and/or wired connections. The one or more sensors 110 sense a coverage area within the local environment 101. The one or more sensors 110 may be spaced around the local environment 101 to increase the coverage area. The local environment 101 may be a room, a number of rooms, a house, apartment, condo, hotel or other similar location.

The voice assistant device 200 communicates with the electronic device 400 via a communication network (not shown) such as the Internet. The voice assistant device 200 also communicates with the communication service infrastructure 300 via the communication network. In some examples, the electronic device 400 may also communicate with the communication service infrastructure 300 via the communication network. Different components of the communication system 100 may communicate with each other via different channels of the communication network, in some examples.

The communication network enables exchange of data between the voice assistant device 200, the communication service infrastructure 300 and the electronic device 400. The communication network may comprise a plurality of networks of one or more network types coupled via appropriate methods known in the art, comprising a local area network (LAN), such as a wireless local area network (WLAN) such as Wi-Fi™, a wireless personal area network (WPAN), such as Bluetooth™ based WPAN, a wide area network (WAN), a public-switched telephone network (PSTN), or a public-land mobile network (PLMN), also referred to as a wireless wide area network (WWAN) or a cellular network. The WLAN may include a wireless network which conforms to IEEE 802.11x standards or other communication protocol.

The voice assistant device 200 is equipped for one or both of wired and wireless communication. The voice assistant device 200 may be equipped for communicating over LAN, WLAN, Bluetooth, WAN, PSTN, PLMN, or any combination thereof. The voice assistant device 200 may communicate securely with other devices and systems using, for example, Transport Layer Security (TLS) or its predecessor Secure Sockets Layer (SSL). TLS and SSL are cryptographic protocols which provide communication security over the Internet. TLS and SSL encrypt network connections above the transport layer using symmetric cryptography for privacy and a keyed message authentication code for message reliability. When users secure communication using TSL or SSL, cryptographic keys for such communication are typically stored in a persistent memory of the voice assistant device 200.

The voice assistant device 200 includes a controller comprising at least one processor 205 (such as a microprocessor) which controls the overall operation of the voice assistant device 200. The processor 205 is coupled to a plurality of components via a communication bus (not shown) which provides a communication path between the components and the processor 205.

In this example, the voice assistant device 200 includes a number of sensors 215 coupled to the processor 205. The sensors 215 may include a biometric sensor 210, a motion sensor 220, a camera 230, a microphone 240, an infrared (IR) sensor 250 and/or a proximity sensor 260. A data usage monitor and analyzer 270 may be used to automatically capture data usage, and may also be considered to be a sensor 215. The sensors 215 may include other sensors (not shown) such as a satellite receiver for receiving satellite signals from a satellite network, orientation sensor, electronic compass or altimeter, among possible examples.

The processor 205 is coupled to one or more memories 235 which may include Random Access Memory (RAM), Read Only Memory (ROM), and persistent (non-volatile) memory such as flash memory, and a communication module 225 for communication with the communication service infrastructure 300. The communication module 225 includes one or more wireless transceivers for exchanging radio frequency signals with wireless networks of the communication system 100. The communication module 225 may also include a wireline transceiver for wireline communications with wired networks.

The wireless transceivers may include one or a combination of Bluetooth transceiver or other short-range wireless transceiver, a Wi-Fi or other WLAN transceiver for communicating with a WLAN via a WLAN access point (AP), or a cellular transceiver for communicating with a radio access network (e.g., cellular network). The cellular transceiver may communicate with any one of a plurality of fixed transceiver base stations of the cellular network within its geographic coverage area. The wireless transceivers may include a multi-band cellular transceiver that supports multiple radio frequency bands. Other types of short-range wireless communication include near field communication (NFC), IEEE 802.15.3a (also referred to as UltraWideband (UWB)), Z-Wave, ZigBee, ANT/ANT+ or infrared (e.g., Infrared Data Association (IrDA) communication). The wireless transceivers may include a satellite receiver for receiving satellite signals from a satellite network that includes a plurality of satellites which are part of a global or regional satellite navigation system.

The voice assistant device 200 includes one or more output devices, including a speaker 245 for providing audio output. The one or more output devices may also include a display (not shown). In some examples, the display may be part of a touchscreen. The touchscreen may include the display, which may be a color liquid crystal display (LCD), light emitting diode (LED) display or active-matrix organic light emitting diode (AMOLED) display, with a touch-sensitive input surface or overlay connected to an electronic controller. In some examples, the voice assistant device 200 may be a primarily audible device (e.g., where the voice assistant device 200 is a smart speaker), having only or primarily audio output devices such as the speaker 245. The voice assistant device 200 may also include one or more auxiliary output devices (not shown) such as a vibrator or LED notification light, depending on the type of voice assistant device 200. It should be noted that even where the voice assistant device 200 is a primarily audible device, an auxiliary output device may still be present (e.g., an LED to indicate power is on).

The voice assistant device 200 includes one or more input devices, including a microphone 240 for receiving audio input (e.g., voice input). The one or more input devices may also include one or more additional input devices (not shown) such as buttons, switches, dials, a keyboard or keypad, or navigation tool, depending on the type of voice assistant device 200. In some examples, the voice assistant device 200 may be a primarily audible device (e.g., where the voice assistant device 200 is a smart speaker), having only or primarily audio input devices such as the microphone 240. The voice assistant device 200 may also include one or more auxiliary input devices (not shown) such as a button, depending on the type of voice assistant device 200. It should be noted that even where the voice assistant device 200 is a primarily audible device, an auxiliary input device may still be present (e.g., a power on/off button).

The voice assistant device 200 may also include a data port (not shown) such as serial data port (e.g., Universal Serial Bus (USB) data port).

In the voice assistant device 200, operating system software executable by the processor 205 is stored in the persistent memory of the memory 235 along with one or more applications, including a voice assistant application. The voice assistant application comprises instructions for implementing an audible interface 237 (e.g., a voice user interface (VUI) for a voice assistant), to enable a user to interact with and provide instructions to the voice assistant device 200 via audible (e.g., voice) input. The memory 235 may also include a natural language processing (NLP) function 239, to enable audible input to be analyzed into commands, input and/or intents, for example. Other applications such as mapping, navigation, media player, telephone and messaging applications, etc. may also be stored in the memory. The voice assistant application, when executed by the processor 205, allows the voice assistant device 200 to perform at least some embodiments of the methods described herein. The memory 235 stores a variety of data, including sensor data acquired by the sensors 215; user data including user preferences, settings and possibly biometric data about the user for authentication and/or identification; a download cache including data downloaded via the wireless transceivers; and saved files. System software, software modules, specific device applications, or parts thereof, may be temporarily loaded into RAM. Communication signals received by the voice assistant device 200 may also be stored in RAM. Although specific functions are described for various types of memory, this is merely one example, and a different assignment of functions to types of memory may be used in other embodiments.

The communication service infrastructure 300 includes a voice assistant server 305 and a web application server 315. The voice assistant server 305 and the web application server 315 each includes a communication interface (not shown) to enable communications with other components of the communication system 100. The web application server 315 provides an authorization server application programming interface (API) 325, resource server API 335, and an interface map function 340, among other APIs and functions, the functions of which are described below. The web application server 315 may provide services and functions for the voice assistant device 200. For example, the web application server 315 may include the interface map function 340, which may enable a visual user interface (e.g., a graphical user interface (GUI)) to be mapped to an audible user interface (e.g., a voice user interface (VUI)) and vice versa, as discussed further below. The interface map function 340 may include sub-modules or sub-functions, such as an interface generator 343 and a mapping database 345. The web application server 315 may also include a session record database 347, in which a state of an ongoing user session may be saved, as discussed further below. The voice assistant server 305 and the web application server 315 may be operated by different entities, introducing an additional security in allowing the voice assistant server 305 to assess data of the web application server 315, particularly private data such as banking information. In other embodiments, the voice assistant server 305 may be a server module of the web application server 315 rather than a distinct server. Each of the web application server 315 and voice assistant server 305 may be implemented by a single computer system that may include one or more server modules.

The voice assistant application (e.g., stored in the memory 235 of the voice assistant device 200) may be a client-side component of a client-server application that communicates with a server-side component of the voice assistant server 305. Alternatively, the voice assistant application may be a client application that interfaces with one or more APIs of the web application server 315 or IoT device manager 350. One or more functions/modules described as being implemented by the voice assistant device 200 may be implemented or provided by the voice assistant server 305 or the web application server 315. For example, the NLP function 239 may be implemented in the voice assistant server 305 via an NLP module 330 (FIG. 2) instead of the voice assistant device 200. In another example, the audible interface function 237 may not be implemented in the voice assistant device 200. Instead, the web application server 315 or voice assistant server 305 may store instructions for implementing an audible interface with the voice assistant device 200 acting as a thin client that merely acquires sensor data, sends the sensor data to the web application server 315 and/or voice assistant server 305 which processes the sensor data, receives instructions from the web application server 315 and/or voice assistant server 305 in response to the processed sensor data, and performs the received instructions.

The electronic device 400 in this example includes a controller including at least one processor 405 (such as a microprocessor) which controls the overall operation of the electronic device 400. The processor 405 is coupled to a plurality of components via a communication bus (not shown) which provides a communication path between the components and the processor 405.

Examples of the electronic device 400 include, but are not limited to, handheld or mobile wireless communication devices, such as smartphones, tablets, laptop or notebook computers, netbook or ultrabook computers; as well as vehicles having an embedded-wireless communication system (sometimes known as an in-car communication module), such as a Wi-Fi or cellular equipped in-dash infotainment system, or tethered to another wireless communication device having such capabilities. Mobile wireless communication devices may include devices equipped for cellular communication through PLMN or PSTN, mobile devices equipped for Wi-Fi communication over WLAN or WAN, or dual-mode devices capable of both cellular and Wi-Fi communication. In addition to cellular and Wi-Fi communication, a mobile wireless communication device may also be equipped for Bluetooth and/or NFC communication. In various embodiments, the mobile wireless communication device may be configured to operate in compliance with any one or a combination of a number of wireless protocols, including Global System for Mobile communications (GSM), General Packet Radio Service (GPRS), code-division multiple access (CDMA), Enhanced Data GSM Environment (EDGE), Universal Mobile Telecommunications System (UMTS), Evolution-Data Optimized (EvDO), High Speed Packet Access (HSPA), $3^{rd}$ Generation Partnership Project (3GPP), or a variety of others. It will be appreciated that the mobile wireless communication device may roam within and across PLMNs. In some instances, the mobile wireless communication device may be configured to facilitate roaming between PLMNs and WLANs or WANs.

The electronic device 400 includes one or more output devices 410 coupled to the processor 405. The one or more output devices 410 may include, for example, a speaker and a display (e.g., a touchscreen). Generally, the output device(s) 410 of the electronic device 400 is capable of providing visual output and/or other types of non-audible output (e.g., tactile or haptic output). The electronic device 400 may also include one or more additional input devices 415 coupled to the processor 405. The one or more input devices 415 may include, for example, buttons, switches, dials, a keyboard or keypad, or navigation tool, depending on the type of electronic device 400. In some examples, an output device 410 (e.g., a touchscreen) may also serve as an input device 415. A visual interface, such as a GUI, may be rendered and displayed on the touchscreen by the processor 405. A user may interact with the GUI using the touchscreen and optionally other input devices (e.g., buttons, dials) to display relevant information, such as banking or other financial information, etc. Generally, the electronic device 400 may be configured to process primarily non-audible input and to provide primarily non-audible output.

The electronic device 400 may also include one or more auxiliary output devices (not shown) such as a vibrator or LED notification light, depending on the type of electronic device 400. The electronic device 400 may also include a data port (not shown) such as a serial data port (e.g., USB data port).

The electronic device 400 may also include one or more sensors (not shown) coupled to the processor 405. The sensors may include a biometric sensor, a motion sensor, a camera, an IR sensor, a proximity sensor, a data usage analyser, and possibly other sensors such as a satellite receiver for receiving satellite signals from a satellite network, orientation sensor, electronic compass or altimeter.

The processor 405 is coupled to a communication module 420 that comprises one or more wireless transceivers for exchanging radio frequency signals with a wireless network that is part of the communication network. The processor 405 is also coupled to a memory 425, such as RAM, ROM or persistent (non-volatile) memory such as flash memory. In some examples, the electronic device 400 may also include a satellite receiver (not shown) for receiving satellite signals from a satellite network that comprises a plurality of satellites which are part of a global or regional satellite navigation system.

The one or more transceivers of the communication module 420 may include one or a combination of Bluetooth transceiver or other short-range wireless transceiver, a Wi-Fi or other WLAN transceiver for communicating with a WLAN via a WLAN access point (AP), or a cellular transceiver for communicating with a radio access network (e.g., cellular network).

Operating system software executable by the processor 405 is stored in the memory 425. A number of applications executable by the processor 405 may also be stored in the memory 425. For example, the memory 425 may store instructions for implementing a visual interface 427 (e.g., a GUI). The memory 425 also may store a variety of data. The data may include sensor data sensed by the sensors; user data including user preferences, settings and possibly biometric data about the user for authentication and/or identification; a download cache including data downloaded via the transceiver(s) of the communication module 420; and saved files. System software, software modules, specific device applications, or parts thereof, may be temporarily loaded into a volatile store, such as RAM, which is used for storing runtime data variables and other types of data or information. Communication signals received by the electronic device 400 may also be stored in RAM. Although specific functions are described for various types of memory, this is merely one example, and a different assignment of functions to types of memory may be used in other embodiments.

The electronic device 400 may also include a power source (not shown), for example a battery such as one or more rechargeable batteries that may be charged, for example, through charging circuitry coupled to a battery interface such as a serial data port. The power source provides electrical power to at least some of the components of the electronic device 400, and a battery interface may provide a mechanical and/or electrical connection for the battery.

One or more functions/modules described as being implemented by the electronic device 400 may be implemented or provided by the web application server 315. For example, the visual interface function 427 may not be implemented in the electronic device 400. Instead, the web application server 315 may store instructions for implementing a visual interface.

The above-described communication system 100 is provided for the purpose of illustration only. The above-described communication system 100 includes one possible communication network configuration of a multitude of possible configurations. Suitable variations of the communication system 100 will be understood to a person of skill in the art and are intended to fall within the scope of the present disclosure. For example, the communication service infrastructure 300 may include additional or different elements in other embodiments. In some embodiments, the system includes multiple components distributed among a plurality of computing devices. One or more components may be in the form of machine-executable instructions embodied in a machine-readable medium.

Data from the electronic device 400 and/or the sensor(s) 110 may be received by the voice assistant device 200 (e.g., via the communication module 225) for processing, or for forwarding to a remote server, such as the web application server 315 (optionally via the voice assistant server 305), for processing. Data may also be communicated directly between the electronic device 400 and the web application server 315 (e.g., to enable session transfer as discussed further below).

In some examples, sensor data may be communicated directly (indicated by dashed arrows) from the sensor(s) 110 to the remote server (e.g. the web application server 315), for example wirelessly via Wi-Fi, without being handled through the voice assistant device 200. Similarly, the sensors 215 of the voice assistant device 200 may communicate directly (indicated by dashed arrow) with the remote server, (e.g. the web application server 315), for example wirelessly via Wi-Fi, without being handled through the voice assistant server 305. The voice assistant device 200 may still communicate with the voice assistant server 305 for the communications session, but sensor data may be communicated directly to the web application server 315 via a separate data channel.

Figure 1B:
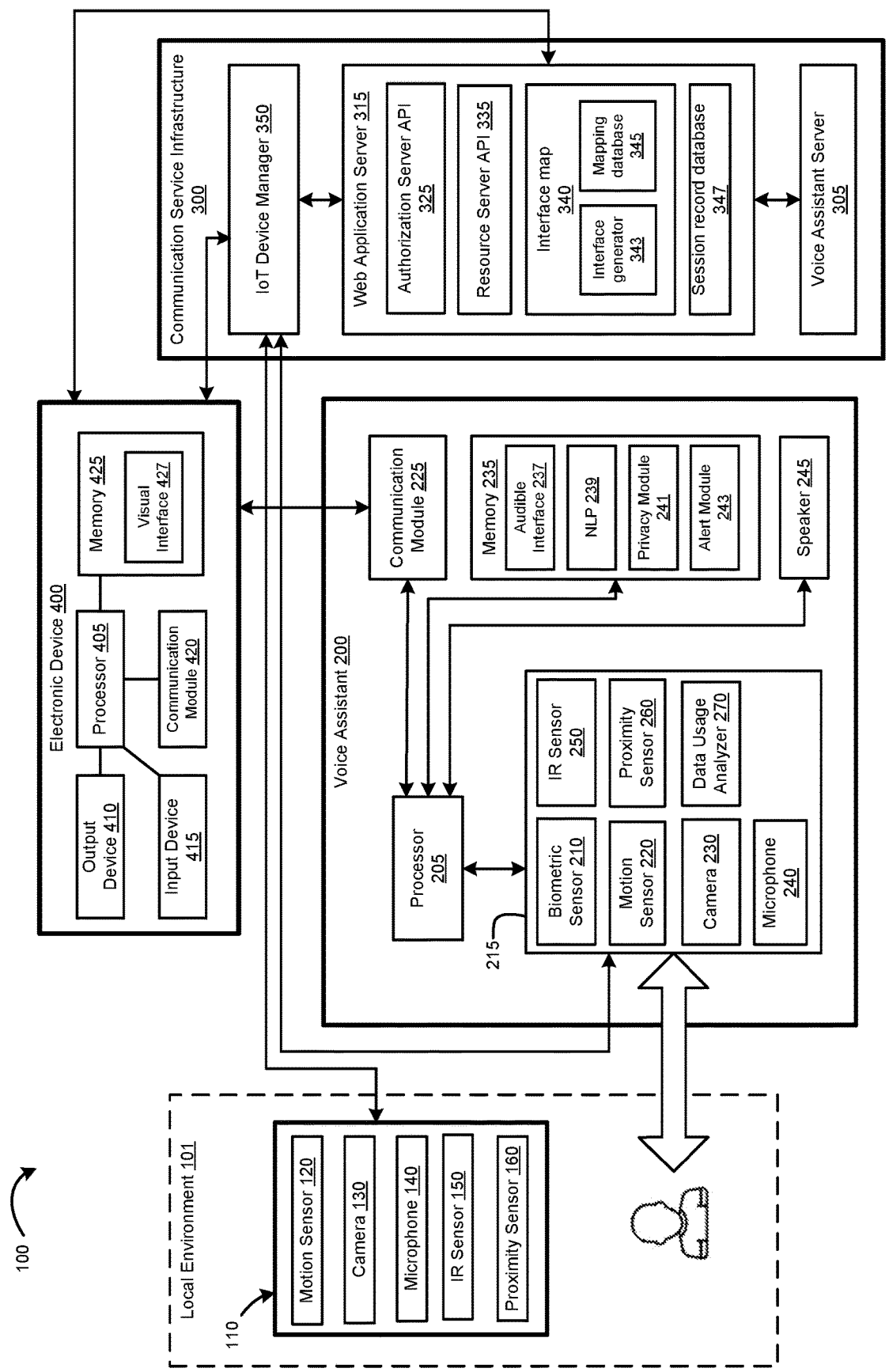

FIG. 1B shows another example embodiment of the communication system 100. The communication system 100 shown in FIG. 1B is similar to the communication system 100 shown in FIG. 1A, with differences as discussed below. In FIG. 1B, the one or more sensors 110 in the local environment 101, the sensors 215 of the voice assistant device 200 and the connected electronic device 400 communicate with an IoT device manager 350 that is part of the communication service infrastructure 300. The IoT device manager 350 is connected to the web application server 315, and forwards the acquired sensor data to the web application server 315 for processing. In the embodiment of FIG. 1B, the voice assistant device 200 may still communicate with the voice assistant server 305 for the communications session, but sensor data may be communicated to the web application server 315 via a separate data channel. Similarly, the electronic device 400 may still communicate with the voice assistant device 200, but sensor data from the electronic device 400 may be communicated to the web application server 315 via the IoT device manager 350. Communication of other data (e.g., other non-sensor data) may be communicated as described above with reference to FIG. 1A.

Web Application Server

Figure 2:
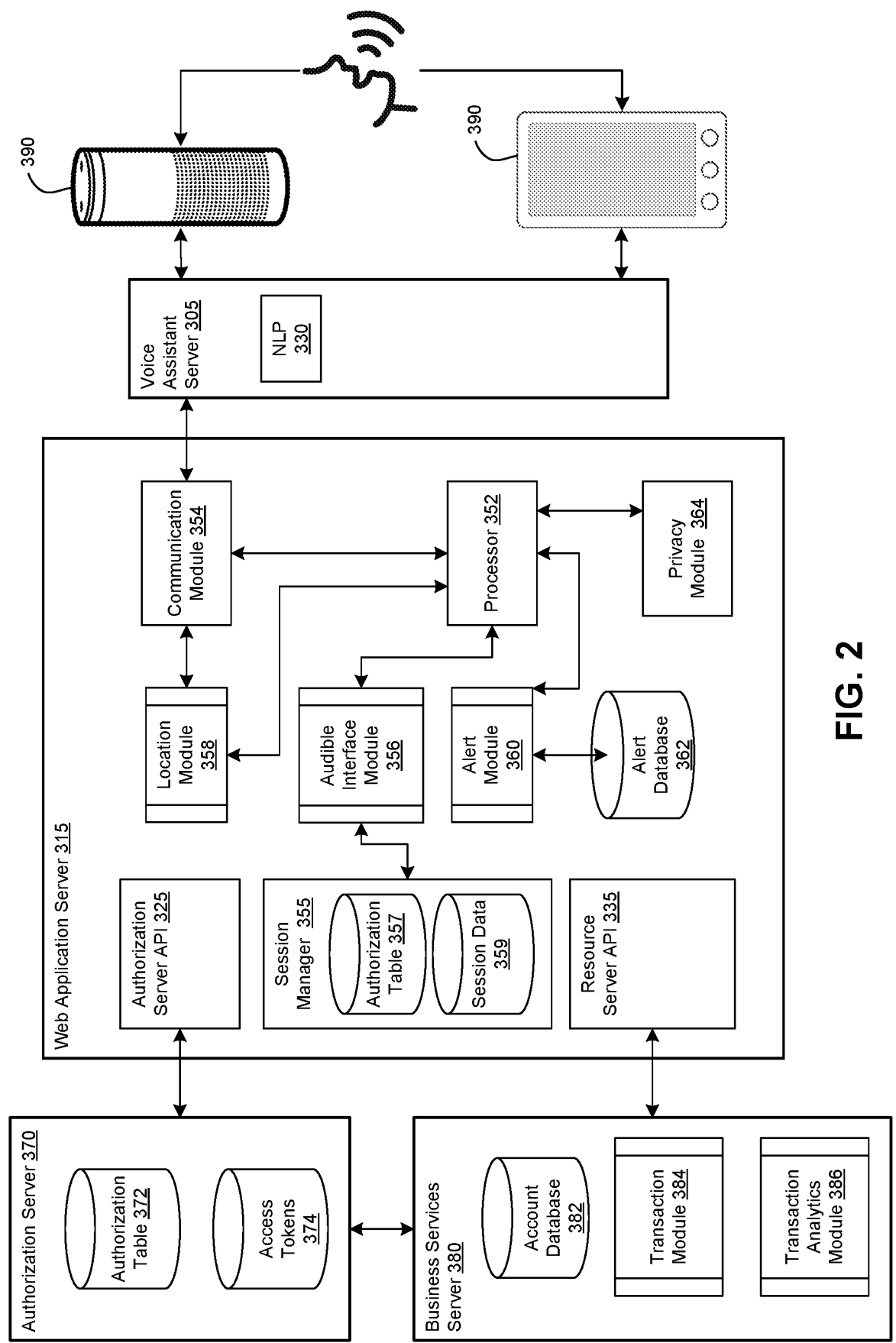
FIG. 2 is a block diagram of a web application server in accordance with one example embodiment of the present disclosure.

Reference is next made to FIG. 2 which illustrates in simplified block diagram form a web application server 315 in accordance with example embodiments of the present disclosure. The web application server 315 comprises a controller comprising at least one processor 352 (such as a microprocessor) which controls the overall operation of the web application server 315. The processor 352 is coupled to a plurality of components via a communication bus (not shown) which provides a communication path between the components and the processor 352. The processor 352 is coupled to a communication module 354 that communicates directly or indirectly with corresponding communication modules of audible interface devices 390 such as voice assistant devices 200 and electronic devices 400 and possibly communicates other computing devices by sending and receiving corresponding signals. The communication module 354 may communicate via one or a combination of Bluetooth® or other short-range wireless communication protocol, Wi-Fi™, and a cellular, among other possibilities. The processor 352 is also coupled to RAM, ROM, persistent (non-volatile) memory such as flash memory, and a power source.

In the shown embodiment, voice data received by the audible interface devices 390 is first sent to the voice assistant server 305 which interprets the voice data using the NLP module 330. The NLP module 330, in at least some embodiments, converts speech contained in the voice data into text using speech-to-text synthesis in accordance with speech-to-text synthesis algorithms, the details of which are outside the scope of the present disclosure. The text is then parsed and processed to determine an intent (e.g., command) matching the speech contained in the voice data and one or more parameters for the intent based on a set of pre-defined intents of the web application server 305. The resultant data may be contained in a JavaScript Object Notation (JSON) data packet. The JSON data packet may content raw text from speech-to-text synthesis and an intent. The training/ configuration of the NLP module 330 for the set of intents of the web application server 305 is outside the scope of the present disclosure. The voice assistant server 305 may be provided or hosted by a device vendor of the corresponding the audible interface devices 390. When audible interface devices 390 from more than one vendor are supported, a voice assistant server 305 may be provided for each vendor.

The web application server 315 may comprise input devices such as a keyboard and mouse or touchscreen and output devices such as a display and a speaker. The web application server may also comprise various data input/output (I/O) ports such as serial data port (e.g., USB data port). Operating system software executed by the processor 352 is stored in the persistent memory but may be stored in other types of memory devices, such as ROM or similar storage element. Applications executed by the processor 352 are also stored in the persistent memory. System software, software modules, specific device applications, or parts thereof, may be temporarily loaded into a volatile store, such as RAM, which is used for storing runtime data variables and other types of data or information. Communication signals received by the web application server 315 may also be stored in RAM. Although specific functions are described for various types of memory, this is merely one example, and a different assignment of functions to types of memory may be used in other embodiments.

The processor 352 is coupled to a location module 358 that determines or monitors the location of audible interface devices 390 and personal electronic devices of authorized users, a session manager 355 for managing communication sessions with audible interface devices 390, an audible interface module 356 that processes audible interface data received from the audible interface devices 390 such as intent data and generates instructions and data for the audible interface devices 390 based on the processed intent data such as audible interface instructions and data for the audible interface devices 390, an alert module 360 that monitors for and detects events for generating audible alerts and that generates audible alert instructions for generating audible alerts on an audible interface device 390, and a privacy module 364. The location module 358, audible interface module 356 and alert module 360 may be implemented in hardware or software stored in the memory of the web application server 315, depending on the embodiment.

The audible interface module 356 provides administrative functions for the audible interface devices 390. The audible interface module 356 may comprise an audible identifier database comprising a plurality of user-defined audible identifiers, one user-defined audible identifier for each authorized user in the plurality of authorized users. The audible identifiers may be a non-verbal sound or a verbal message in the form of a user indicator. The user indicator may be a user name of the authorized user.

The location module 358 maintains a listing of all authorized audible interface devices 390 and personal electronic devices of all authorized users for a respective user and a location for each audible interface device 390 as well as a location of the respective user. The audible interface devices 390 may be voice assistant devices 200, electronic devices 400 such as smartphones, in-car communication (ICC) module, or a combination thereof, as noted above. Each authorized audible interface device 390 for a respective user is identified by the location module 358 by a corresponding device identifier (ID) and/or a device name. The location of the respective user may be determined by determining a location associated with a personal electronic device of the user, such as a wearable electronic device adapted to be worn or carried by the user. The personal electronic device may be one of the audible interface devices 390. More than one personal electronic device may be used to determine the user's location.

The location of the audible interface devices 390 and the personal electronic device may be determined using any suitable location determining means, such as a Global Navigation Satellite System (GNSS) data (e.g., Global positioning system (GPS) data), cellular signal triangulation, etc., the details of which are known in the art. The location of each audible interface device is determined either directly from each audible interface devices capable of communicating its location or indirectly through another device connected to the audible interface device. Thus, the location module 358 maintains location information comprising a location for each of the audible interface devices 390 and the personal electronic device. The timeliness or currency of the location information may vary depending on the location determining means used, device status (e.g., powered-on or powered-off), and device location (e.g., is device within range to report location or data used to determined location).

The location module 358 may determine whether the user is within the threshold distance of an audible interface based on the location of the user and the locations of the audible interface devices 390 in response to a request by the processor 352. Alternatively, the location module 358 may report the location information directly to the processor 352 which then performs the determination based on the location information.

In alternate embodiments, the audible interface devices 390 and the personal electronic device(s) used to determine the location of the user may communicate to determine a relative distance between the devices. In such embodiments, if the relative distance between the devices is found to be less than a threshold amount (e.g., threshold distance), a communication may be sent to the location module 358 indicating that the two locations are within the threshold distance. The communication may be sent by one or more of the devices or another device, i.e. a proxy device, that enables communication capability.

The web application server 315 comprises the authorization server API 325 and resource server API 335 described above. The resource server API 335 is an API that allows the web application server 315 to communicate securely with a resource server such as a business services server 380 which contains data, including private data, which may be exchanged with the audible interface devices 390. In the shown embodiment, the business services server 380 may be operated by a financial institution such as a bank and comprises an account database 382 that includes private data in the form of banking data. The business services server 380 also includes various functional modules for performing operations, such as data queries/searches and data transfers (e.g., transactions) based upon the banking data including, for example, a transaction module 384 for performing data transfers/transactions and a transaction analytics module 386 for performing queries/searches and analytics based on the banking data.

Audible interface devices 390 are authorized and authenticated before communication with the web application server 315 is allowed. The specifics of the authorization and authentication process are outside the scope of the present disclosure but may be, for example, the OAuth or OAuth 2.0 open standard for token-based authentication and authorization on the Internet. The authorization server API 325 is an API that allows the web application server 315 to communicate securely with an authorization server 370 which authenticates and authorizes audible interface devices 390. The authorization server API 325 maintains authorization information for each audible interface device 390.

As noted above, the web application server 315 may use the OAuth 2.0 open standard for token-based authentication and authorization in at least some embodiments or similar authentication and authorization protocol. In such embodiments, the authorization information comprises an authorization table 372 that comprises a listing of authorized audible interface devices 390 and access tokens 374 for the authorized audible interface devices 390 and possibly similar information for other authorized devices. The authorization table 372 may specify for each of the authorized audible interface devices 390, a device ID and/or device name, an access token ID, a date the access token was granted, and a date the access token expires. The authorization server API 325 maintains authorization information for each audible interface device 390. The authorization information maintained by the authorization server API 325 may include a listing for each audible interface device 390 whether the audible interface device 390 is shared, and if so, the other users with whom the audible interface device 390 is shared.

OAuth defines four roles: a resource owner (e.g., user), a client (e.g., application such as a banking application on an audible interface device 390), a resource server (e.g., business services server 380, and an authorization server 370. The resource owner is the user who authorizes an application to access their account. The application's access to the user's account is limited to the scope of the authorization granted (e.g., read or write access). The resource server (e.g., business services server 380) hosts the protected user accounts and the authorization server 370 verifies the identity of the user then issues access tokens to the application. A service API may perform both the resource and authorization server roles. The client is the application that wants to access the user's account. Before the application may do so, the application must be authorized by the user and the authorization must be validated by the authorization server 370 and business services server 380.

Figure 6:
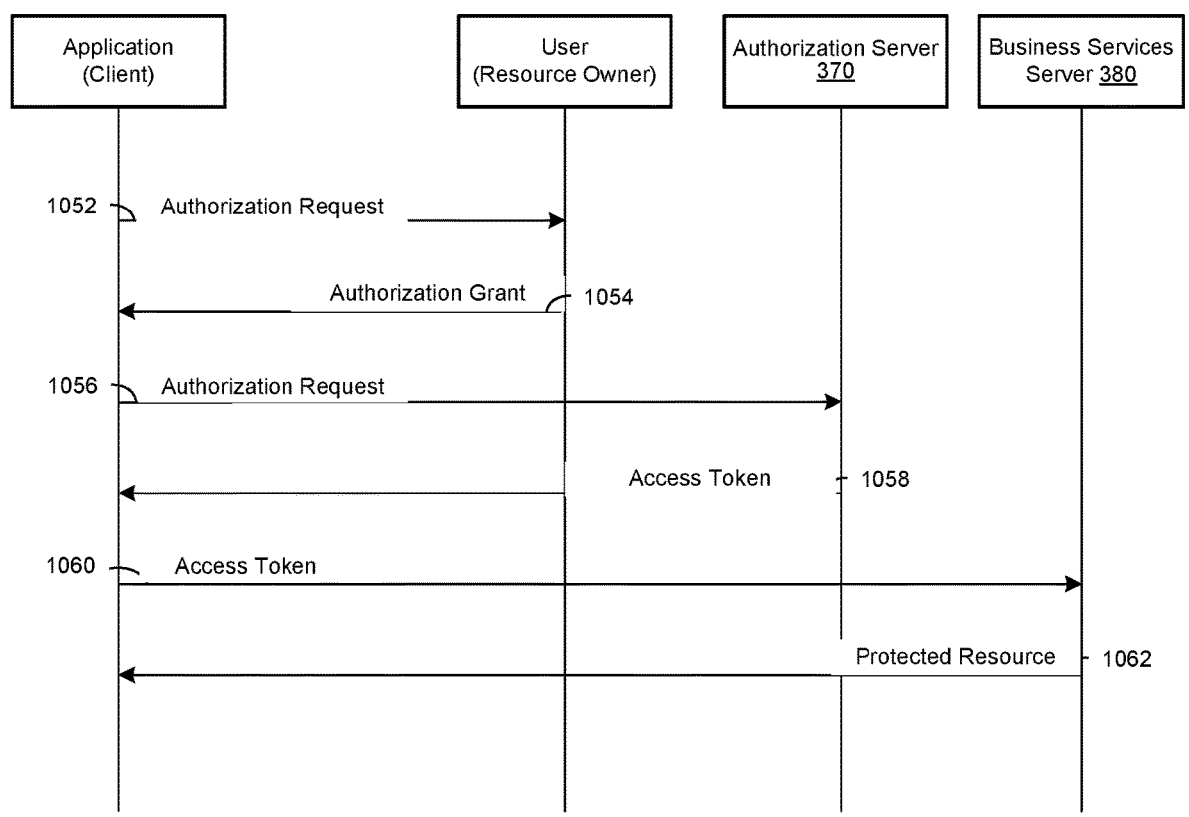
FIG. 6 is a message sequence diagram illustrating a token-based authentication and authorization method suitable for use by example embodiments of the present disclosure.

Referring briefly to FIG. 6, the OAuth 2.0 standard for token-based authentication and authorization will be briefly described. At operation 1052, the application requests authorization to access service resources from the user. At operation 1054, if the user authorized the request, the application receives an authorization grant. At operation 1056, the application requests an access token from the authorization server API 325 by presenting authentication of its own identity and the authorization grant. At operation 1058, if the application identity is authenticated and the authorization grant is valid, the authorization server API 325 issues an access token to the application. Authorization of the application on an audible interface device 390 is complete. At operation 1060, when application seeks to access the protected resource, the application requests the resource from the resource server API 325 and presents the access token for authentication. At operation 10602, if the access token is valid, the resource server API 325 serves the resource to the application.

The following documents are relevant to the present disclosure and are incorporated herein by reference: OAuth 2.0 Framework—RFC 6749, OAuth 2.0 Bearer Tokens—RFC 6750, Threat Model and Security Considerations—RFC 6819, OAuth 2.0 Token Introspection—RFC 7662, to determine the active state and meta-information of a token, OAuth 2.0 Token Revocation—RFC 7009, to signal that a previously obtained token is no longer needed, JSON Web Token—RFC 7519, OAuth Assertions Framework—RFC 7521, Security Assertion Markup Language (SAML) 2.0 Bearer Assertion—RFC 7522, for integrating with existing identity systems, and JSON Web Token (JWT) Bearer Assertion—RFC 7523, for integrating with existing identity systems.

Communications from the audible interface devices 390 to the business services server 380 include the corresponding access token for the respective audible interface device 390, thereby allowing the respective voice assistant device to access the protected resources. For additional security, a session token may also be included with communications from the audible interface devices 390 to the business services server 380 in some embodiments, as described below. The session tokens are typically issued by the authorization server 370 using a suitable protocol.

The alert module 360 is configured to monitor for events for generating an audible alert for a user, and detect such events. The alert module 360 may communicate with the business services server 380 via the resource server API 335 to monitor for and detect for events for generating an audible alert for the user. For example, the alert module 360 may implement listeners that monitor for and detected events of the transaction module 384 and/or transaction analytics module 386, among other possibilities. The alert module 360 may store event data for use in generating audible alerts in an alert database 362. Alert data for audible alerts may also be stored in the alert database 362, for example, in association with the corresponding event data. The alert data is derived from, or comprises, the event data.

The privacy module 364 performs a variety of functions related to privacy, depending on the embodiment. The privacy module 364 may receive a privacy rating of the local environment 101 of the audible interface device 390. The privacy rating is based on location and/or sensor data collected by the audible interface device 390. The privacy module 364 may also receive the location and/or sensor data upon which the privacy rating was determined. Alternatively, the privacy module 364 may receive location and/or sensor data from the audible interface device 390 and determine a privacy rating of the local environment 101 of the audible interface device 390. The nature of the privacy rating may vary. In the simplest form, the private rating may be a bimodal determination of "private" or "non-private". However, other more delineated determinations of privacy may be determined in other embodiments.

The web application server 315, via the privacy module 362, may maintain a privacy rating for each audible interface device 390 at all times. The privacy rating for each audible interface device 390 may be fixed or may be dynamically determined by the audible interface device 390 or by the privacy module 362 of the web application server 315 based on location and/or sensor data. The privacy rating may be based on a privacy confidence interval.

The session manager 355 manages conversations including communication sessions between the web application server 315 and audible interface devices 390. Each audible interface device 390 may have a separate, device-specific communication session. The session manager 355 may comprise a conversation manager (not shown) that manages conversations in user engagement applications that span one or more channels such as web, mobile, chat, interactive voice response (IVR) and voice in real-time. A conversation comprises one or more number of user interactions over one or more channels spanning a length of time that are related by context. A conversation may persist between communication sessions in some embodiments. Context may comprise a service, a state, a task or extended data (anything relevant to the conversation). The conversation manager detects events (also known as moments) in the conversation when action should be taken. The conversation manager comprises a context data store, context services, and a business rules system. Context services provide contextual awareness with regards to the user, such as knowing who the user is, what the user wants, and where the user is in this process. Context services also provide tools to manage service, state and tasks.

The session manager 355 stores session data 359 associated with conversations including secure communication sessions between the web application server 315 and audible interface devices 390. The session data 359 associated with a conversation may be transferred to, or shared with, different endpoints if the conversation moves between channels. The session data 359 may include session tokens in some embodiments, as described below. Session data 359 associated with different sessions in the same conversation may be stored together or linked.

To determine the privacy of the environment 101 of the audible interface device 390, sensor data is acquired by one or more sensors, which may be fixed or mobile depending on the nature of the sensors. The sensors may comprise one or more sensors of the plurality of sensors 215, one or more sensors in the plurality of sensors 110 located in the environment 101, one or more sensors 415 of a connected electronic device 400 such as user's smartphone, or a combination thereof. Each of the sensor array 110, audible interface device 390 and electronic devices 400 may have the same sensors, thereby providing the maximum capability and flexibility in determining the privacy of the environment 101 of the audible interface device 390. The sensor data acquired by the sensors 110, 215, and/or 415 is processed to determine whether a person is present in the local environment 101 and/or a number of persons present in the local environment 101 of the audible interface device 390 via one or more criteria.

The criteria for determining the privacy of the environment 101 of the audible interface device 390 may comprise multiple factors to provide multifactor privacy monitoring. For example, voice recognition and object (person) recognition or facial recognition may be performed to determine a number of persons, and optionally to verify and/or identify those persons. The sensor data used to determine whether a person is present in the local environment 101 and/or a number of persons in the environment may comprise one or a combination of a facial data, voice data, IR heat sensor data, movement sensor data, device event data, wireless (or wired) device usage data or other data, depending on the embodiment. The use of voice recognition and possibly other factors is advantageous because voice samples are regularly being gathered as part of the communication session with the audible interface device 390. Therefore, in at least some embodiments the sensor data comprises voice data.

The sensor data is analyzed by comparing the acquired data to reference data to determine a number of discrete, identified sources. For one example, the sensor data may be used to determine whether a person is present in the local environment 101 and/or a number of persons present in the local environment by performing object (person) recognition on images captured by the camera 130, 230 and/or 430.

For another example, the sensor data may be used to determine whether a person is present in the local environment 101 and/or a number of faces present in images captured by the camera 130, 230 and/or 430 by performing facial recognition on images captured by the camera 130, 230 and/or 430, with unique faces being a proxy for persons.

For yet another example, the sensor data may be used to determine whether a person is present in the local environment 101 and/or a number of voices in audio samples captured by the microphone 140, 240 and/or 440 by performing voice recognition on audio samples captured by the microphone 140, 240 and/or 440, with unique voices being a proxy for persons.

For yet another example, the sensor data may be used to determine whether a person is present in the local environment 101 and/or a number of persons present in the local environment 101 by identifying human heat signatures in IR image(s) captured by the IR sensor 150, 250 and/or 450 by comparing the IR image(s) to a human heat signature profile via heat pattern analysis, with human heat signatures being a proxy for persons.

For yet another example, the sensor data may be used to determine whether a person is present in the local environment 101 and/or a number of persons present in the local environment 101 by identifying a number sources of movements in motion data captured by the motions sensor 120, 220 and/or 420 by comparing the motion data to a human movement profile via movement analysis, with human heat signatures being a proxy for persons.

For yet another example, the sensor data may be used to determine whether a person is present in the local environment 101 and/or a number of persons present in the local environment 101 by detecting wireless communication devices in the local environment 101 and determining the number of wireless communication devices, with unique wireless communication devices being a proxy for persons. The wireless communication devices may be smartphones in some embodiments. The wireless communication devices may be detected in a number of different ways. The wireless communication devices may be detected by the audible interface device 390 or sensor array 110 when the wireless communication devices are connected to a short-range and/or long-range wireless communication network in the local environment 101 using suitable detecting means. For example, the wireless communication devices may be detected by detecting the wireless communication devices on the short-range and/or long-range wireless communication network, or by detecting a beacon message, broadcast message or other message sent by the wireless communication devices when connecting to or using the short-range and/or long-range wireless communication network via a short-range and/or long-range wireless communication protocol (e.g., RFID, NFC™, Bluetooth™, Wi-Fi™, cellular, etc.) when the wireless communication devices are in, or enter, the local environment 101. The message may be detected by a sensor or communication module of the audible interface device 390 (such as the communication module 225 or data usage monitor and analyzer 270) or sensor array 110.

The wireless communication devices in the local environment 101 can be identified by a device identifier (ID) in the transmitted message, such as a media access control (MAC) address, universally unique identifier (UUID), International Mobile Subscriber Identity (IMSI), personal identification number (PIN), etc., with the number of unique device IDs being used to determine the number of unique wireless communication devices.

The privacy module, to determine the number of persons in the local environment 101, monitors for and detects wireless communication devices in the local environment 101 of the audible interface device 390, each wireless communication device in the local environment of the audible interface device 390 being counted as a person in the local environment 101 of the audible interface device 390. The count of the number of devices in the local environment 101 of the audible interface device 390 may be adjusted to take into account electronic devices 400 of the authenticated user, for example, using the device ID of the electronic devices 400. The device ID of the electronic devices 400 may be provided in advance, for example, during a setup procedure, so that electronic devices 400 of the authenticated user are not included in the count of the number of devices in the local environment 101 of the audible interface device 390, or are deduced from the count when present in the local environment 101 of the audible interface device 390.

For yet another example, the sensor data may be used to determine whether a person is present in the local environment 101 and/or a number of persons present in the local environment 101 by identifying a number of active data users (as opposed to communication devices, which may be active with or without a user) by performing data usage analysis on the data usage information captured by the data usage monitor and analyzer 270, with active data users being a proxy for persons.

The assessment of whether the environment is "private" may consider the geolocation of the audible interface device 390. In some examples, if the geolocation is "private", other persons may be present but if the geolocation of the environment is not "private", no other persons may be present. In some examples, if the geolocation of the environment is "private", other persons may be present only if each person in the local environment 101 of the audible interface device 390 is an authorized user whereas in other examples the other persons need not be an authorized user.

The audible interface device 390 may use GPS data, or triangulation via cellular or WLAN access, to determine its geolocation if unknown, and determine whether the geolocation is "private". The determination of whether the determined geolocation is "private" may comprise comparing the determined geolocation to a list of geolocation designated as "private", and determining whether the determined geolocation matches a "private" geolocation. A determined geolocation may be determined to match a "private" geolocation when it falls within a geofence defined for the "private" geolocation. A geofence is a virtual perimeter defined by a particular geographic area using geo-spatial coordinates, such as latitude and longitude. The "private" geolocations may be a room or number of rooms of a house, hotel, apartment of condo building, an entire house, a hotel, or apartment of condo building, a vehicle, or other comparable location. The determined geolocations and "private" geolocations are defined in terms of a geographic coordinate system that depends on the method of determining the geolocation. A common choice of coordinates is latitude, longitude and optionally elevation. For example, when GPS is used to determine the geolocation, the geolocation may be defined in terms of latitude and longitude, the values of which may be specified in one of a number of different formats including degrees minutes seconds (DMS), degrees decimal minutes (DDM), or decimal degrees (DD).

Whether a particular geolocation is private may be pre-set by the user, the web application server 315 (or operator thereof) or a third party service. Alternatively, whether a particular geolocation is private may be determined dynamically in real-time, for example, by the audible interface device 390 or privacy module 364 of the web application server 315, or possibly by prompting a user, depending on the embodiment. Each "private" geolocation may have a common name for easy identification by a user, such as "home", "work", "school", "car", "Mom's house", "cottage", etc. When the "private" geolocation is a mobile location such as a vehicle, the geofence that defines the "private" geolocation is determined dynamically. Additional factors may be used to identify or locate a mobile location, such as a smart tag (e.g., NFC tag or similar short-range wireless communication tag), wireless data activity, etc.

The web application server 315, via the privacy module 364, may maintain a privacy rating for each audible interface device 390 at all times. The privacy rating for each audible interface device 390 may be fixed or may be dynamically determined by the audible interface device 390 or by the privacy module 364 of the web application server 315 based on location and/or sensor data.

Thus, for a given audible interface device 390, the web application server 315 may store a device ID, location, one or more communication addresses (e.g., email address, telephone number, other messaging address) such as a designated or primary communication address, and a privacy rating. A device name may also be assigned to each device. The device name may be based on the location or type of location, e.g., car, kitchen, den, etc. A location name may also be assigned by the user or the web application server 315 for a given location, which may be defined by a specific coordinate, a geofence or coordinate range (e.g., based on GPS coordinates) such as office, home, cottage, etc.

Methods of Delivering Audible Alerts on an Audible Interface Device

Figure 3:
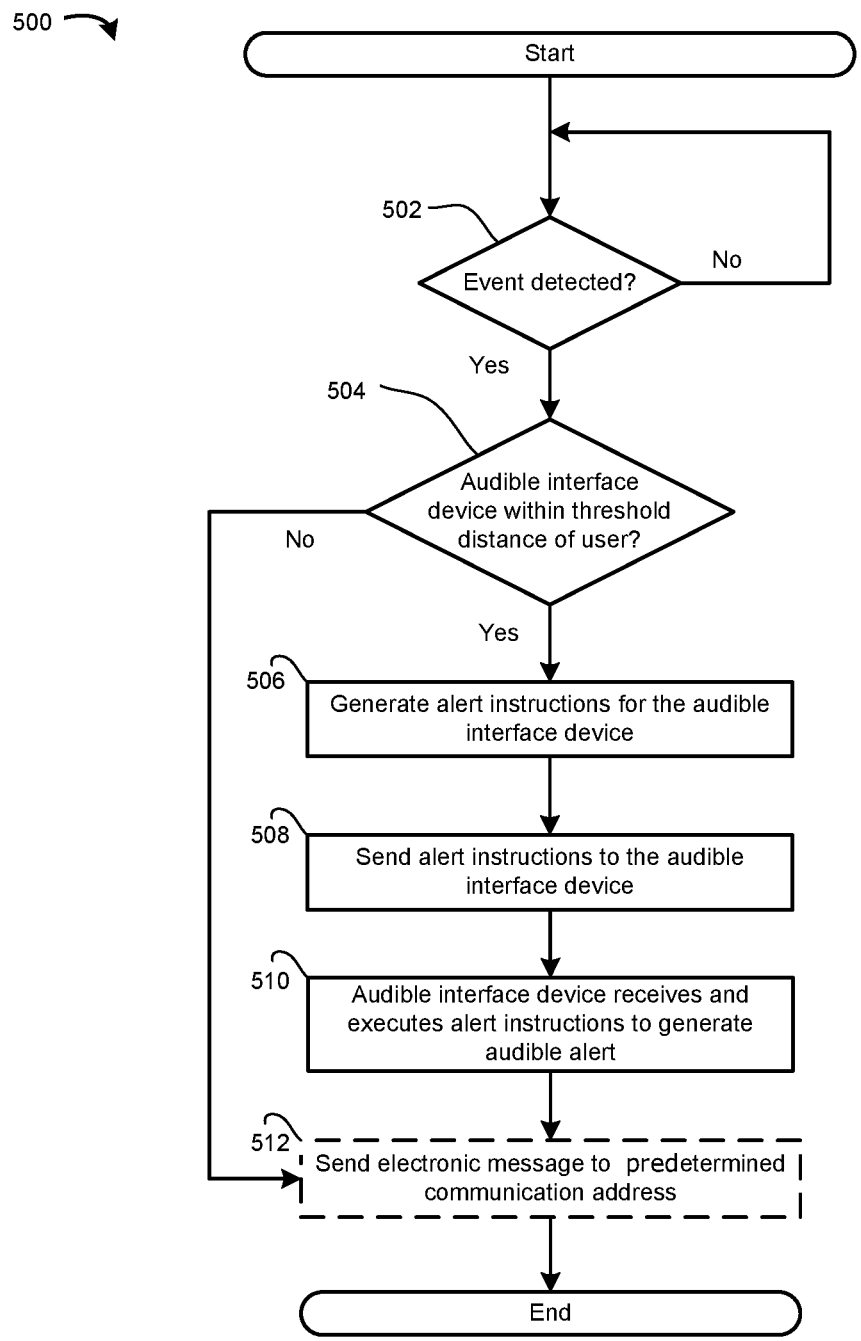
FIG. 3 is a flowchart illustrating a method of delivering audible alerts on an audible interface device in accordance with one example embodiment of the present disclosure.

Referring next to FIG. 3, a method 500 of delivering audible alerts on an audible interface device 390 in accordance with one example embodiment of the present disclosure will be described. The method 500 is performed at least in part by the web application server 315. At operation 502, the processor 352 of the web application server 315 monitors for and detects events for generating an audible alert for a user via the alert module 360. The events could be any type of event depending on the purpose and/or content of the web application server 315 and/or the resource server. When the business services server 380 is a bank server comprising banking data, the event may be a banking event related to a bank account of the user. Examples of banking events include bill issuances, bill due dates, bill payments, credit card payment due dates, loan due dates, loan payments, tax installment due dates, tax installment payments, service charge/fee (e.g., overdraft interest, NSF charge, monthly fee, etc.) due dates, service charge/fee payments, dividend payments, interest payments, interest charges, credit card statement issuance, credit card payment due dates, bank account statement issuance, data transfers such as financial transactions (e.g., debits, new credits) posted or approved to a bank account, credit card or other credit facility of a respective financial institution, change in status of an account of the user (e.g., bank account overdrawn, credit limit exceeded, user-defined account threshold exceeded such as a user-defined budget or spending limit, etc.), receipt of an electronic message/notification via a private, bank messaging platform, or detection of fraudulent or potentially fraudulent activity. The types of events which generate an audible alert may be configurable by the user or possibly a service provider operating the web application server 315 and/or the resource server, such as a bank or other financial institution (FI).

When the processor 352 detects an event for generating an audible alert for a user, operations proceed to operation 504. Otherwise, the processor 352 continues to monitor for events for generating an audible alert for a user or until the operations of the method are terminated.

At operation 504, in response to detection of the event for generating the audible alert, the processor 352 determines whether an authorized audible interface device 390 authorized for a respective user is within a threshold distance of the user based on a location of the user and a location of one or more authorized audible interface devices 390 authorized for a respective user via the location module 358. The threshold distance is a relatively small distance and may be configurable by the user or service provider. The threshold distance may be less than 10 m, less than 5 m, or possibly even less than 2 m. The location of the user may be determined by any means. The location of the user may be determined by determining a location associated with a personal electronic device of the user. The personal electronic device may be a wearable electronic device adapted to be worn (or carried) by the user such as a smartphone, smart watch, smart band, smart glasses, smart card, fob, or similar smart device with identification and wireless communication capabilities.

The location associated with the personal electronic device may be a location determined in real-time or near real-time determined by the server 315 using suitable means, a previously determined location, or may be inferentially/indirectly determined as described below.

The web application server 315 may determine whether an authorized audible interface device 390 is within the threshold distance of the user based on location information maintained by the location module 358. The processor 352 may request the location module 358 to determine whether the user is within the threshold distance of, or otherwise near, any audible interface devices 390. Alternatively, the processor 352 request location information from the location module 358 and perform the determination itself. Alternatively, the web application server 315 may determine whether an authorized audible interface device 390 is within the threshold distance of the user by querying a location service, by querying each authorized audible interface device 390, by querying the personal electronic device of the user, or by querying a proxy device which provides location information on behalf of the authorized audible interface devices 390 or the personal electronic device of the user.

When only one authorized audible interface device 390 is within the threshold distance, that audible interface device 390 is selected as the destination for the delivery of the audible alert.

When more than one authorized audible interface device 390 is within the threshold distance, that audible interface device 390 that is closest to the user may be selected as the destination for the delivery of the audible alert. Alternatively, the audible interface device 390 to be the destination for the delivery of the audible alert may be selected based on a priority list or ranking of the authorized audible interface devices 390. Alternatively, the audible alert may be delivered to all authorized audible interface devices 390 is within the threshold distance.

When no audible interface device 390 authenticated to the user is within the threshold distance, the audible alert may be added to a delivery queue and the location module 358 may determine whether an audible interface device 390 authenticated to the user is within the threshold distance at regular intervals, for example, every 5, 10 or 15 minutes. When an audible interface device 390 authenticated to the user moves within the threshold distance, the audible interface device 390 is selected as the destination for the delivery of the audible alert. Alternatively, alert instructions may be generated for all authorized audible interface devices 390 based on the event and the capabilities, privacy rating and/or context of the respective audible interface device 390, and pushed to the respective audible interface device 390 when no audible interface device 390 authenticated to the user is within the threshold distance. When an audible interface device 390 authenticated to the user moves within the threshold distance, the audible alert is generated on that audible interface device 390. After the audible alert is generated, the respective audible interface device 390 may notify the web application server 315 which, via the alert module 360, may generate alert instructions that cancel or terminate the queued audible alert on other audible interface device 390. The cancel or terminate instructions are then pushed to the relevant audible interface device 390.

When no audible interface device 390 authenticated to the user is within the threshold distance, the processor 352 may send an electronic message, such as an email, comprising the alert data of the audible alert to a predetermined communication address.

At operation 506, in response to determining that an audible interface device 390 is within the threshold distance of the user, the processor 352 generates alert instructions for an audible interface device 390 via the audible interface module 356 based on alert data. The alert instructions are configured to cause the audible interface device 390 to generate the audible alert in accordance with the alert data provided in the alert instructions. The alert instructions may specify a type and characteristics of the audible alert whereas the alert data may specify the content of the audible alert.

The alert module 360 may generate the alert data dynamically in response to instructions of the processor 352 in response to determining that an audible interface device 390 is within the threshold distance of the user based on the event data, contextual information, and/or user settings. Contextual information may comprise a privacy of the environment of the audible interface device 390 to which the audible alert is to be delivered and/or a priority rating assigned to the event. The user settings may include predefined words and/or sounds to be included in the alert to provide customized audible alerts comprising words and/or sounds based on the user settings. The alert instructions and alert data may be determined based at least in part on words or sounds pre-selected by the user and tagged to particular event data and/or event types. For example, the user may assign a cash register sound to indicate that a payment or deposit has been made to the user's account.

Any one or more of a type, content or characteristics of the audible alert may depend on the event data, contextual information, and/or user settings such as a characteristic of the detected event, the privacy of the environment of the audible interface device 390 to which the audible alert is to be delivered, and/or priority rating assigned to the event.

The types of audible alerts may comprise verbal (voice) messages and non-verbal sounds. The characteristics of the audible alert may comprise one or more of audio characteristics or a notification frequency at which the alert is generated. The audio characteristics comprise one or more of a pitch or amplitude. For example, a verbal message may be used to indicate that a user's account is in overdraft when the environment of the audible interface device 390 is determined to be private whereas a ping may be used when the environment of the audible interface device 390 is determined to be non-private.

The characteristic of the event may be a priority rating assigned to the event. The priority rating may be assigned by the business services server 380 based on business rules or logic, user settings or a combination thereof. The characteristic of the event and/or priority rating of the event may be provided to the web application server 315 by the business services server 380, for example, by the transaction module 384 and/or transaction analytics module 386. The priority rating may be one of a predetermined number of priority ratings varying in priority or severity, for example, ranging from high to low. The scale or range of priority ratings may vary. For example, a bimodal frequency of alerts (e.g., high frequency and low frequency) may be used to differentiate between high priority (e.g., very important) alerts, such as fraud detection, and low priority (e.g., unimportant) alerts, such as balance updates.

For another example, the priority ratings of events may be selected from one of "low", "medium" or "high". Events having a "high" priority rating may be associated with audible alerts having any one or a combination of a high pitch, high amplitude, and/or high notification frequency until the event has ended. Similarly, events having a "medium" priority rating may be associated with audible alerts having any one or a combination of a medium pitch, medium amplitude, and/or medium notification frequency until the event has ended. Similarly, events having a "low" priority rating may be associated with audible alerts having any one or a combination of a low pitch, low amplitude, and/or low notification frequency (which may include a notification frequency of NIL or zero) until the event has ended. Varying the pitch, amplitude, and/or notification frequency of alerts may be used to indicate the priority of such alerts.

For a further example, the priority ratings may be assigned a number value from 1 to 10, with the priority of each event increasing linearly from 1 to 10. Each event may be assigned a priority rating based on such scales/ranges. Alternatively, the priority rating may act as a flag wherein only high priority events receive a priority rating and low priority events do not receive a priority rating. For When Please add an embodiment around the location of the alert being allowed or not allowed based on the priority rating where a rating of 10 (fraud) would be initiated in all locations (work, home, car, office) and a priority of "low" would only be allowed at the home.

Alternatively, rather than generating the alert data dynamically, the alert data may be previously generated by the alert module 360 in response to detection of the event, for example, when the privacy of the environment of the audible interface device 390 to which the audible alert is to be delivered is already known.

Similar to the alert data, the audible interface module 356 may generate the alert instructions dynamically based on the event data and optionally other factors such as the privacy of the environment of the audible interface device 390 to which the audible alert is to be delivered.

When the privacy of the environment of the audible interface device 390 to which the audible alert is to be delivered has not already been determined, the web application server 315 may determine whether an environment of the audible interface device is private. The web application server 315 may determine whether the environment of the audible interface device is private in real-time based on sensor data provided by the audible interface device 390 or based on a privacy rating for the audible interface device 390, as described above.

The method of determining whether the local environment 101 is private may vary between embodiments. In all embodiments, sensor data is acquired by one or more sensors to determine whether more than one person is present in the local environment 101 of the audible interface device 390. In some embodiments, determining whether a local environment 101 is private is a two-part process comprising determining whether more than one person is present in the local environment 101, and if not, determining whether the one person in the local environment 101 is the user. In other embodiments, a one-step process of determining whether more than one person is present in the local environment 101 may be applied, and if only one person is present in the local environment 101, it is determined to be "private". In yet other embodiments, a multi-person environment may be supported in which more than one person may be in the local environment 101 and it may be determined to be "private" if one or more predetermined privacy criteria for a multi-person environment are met. The one or more predetermined privacy criteria for a multi-person environment may comprise each person in the local environment 101 of the audible interface device 390 being an authorized user, each person other than the user being more than a threshold distance from the user, or a combination thereof (i.e., any person within the threshold distance must be an authorized user).

In response to determining that the environment of the audible interface device 390 is private, the web application server 315 may be enabled to generate an audible alert comprising a verbal message containing private data. When enabling the web application server 315 to generate an audible alert comprising a verbal message containing private data, the audible alert (e.g., alert data) may be adapted to comprise a verbal message containing private data. In response to determining that the environment of the audible interface device 390 is non-private, the web application server 315 may be disabled from generating an audible alert comprising a verbal message containing private data. The data that is considered to be private data is determined by business rules of the authorization server API 325 and/or resource server API 335, which may vary between embodiments. For example, in some embodiments private data may comprise all banking data and personal data associated the authenticated user whereas non-private data may comprise information not associated with any user, such as local branch information (e.g., address and business hours), general contact information (e.g., toll free telephone number), etc.

When disabling the web application server 315 from generating an audible alert comprising a verbal message containing private data, the audible alert is adapted to comprise a non-verbal sound. Alternatively, when disabling the web application server 315 from generating an audible alert comprising a verbal message containing private data, the audible alert may comprise a verbal message containing a predetermined phrase (or code words) containing non-private data determined during generation of the alert instructions in dependence on the event. The predetermined phrase may be set by the user. For example, in response to determining that the environment of the audible interface device 390 is non-private the audible alert may contain the phrase "the sea is red" to indicate to the user that he/she is overdue on a bill or in overdraft on his/her account whereas the audible alert may contain the phrase "the sea is blue" to indicate to user that there is a surplus in his/her account. In this way, private information can be passed to a user in a private way while the user is not in a private setting.

At operation 508, the communication module 354 sends the alert instructions to the audible interface device 390 over the wireless network via the communication module in response to instructions by the processor 352.

At operation 510, the communications module 225/420 of the audible alert device 390 receives the alert instructions and executes the alert instructions, thereby causing the audible interface device 390 to generate the audible alert. The audible interface device 390 may generate the audible alert at a notification frequency until input dismissing or deferring the audible alert is received by the audible interface device.

If the user has not been authenticated on the audible interface device 390, the user may be prompted to authenticate himself/herself on the audible interface device 390 before the audible alert will be generated by the audible interface device 390, for example, using a shared secret such as a PIN. The prompt may be audio only or visual. If the user has not been authenticated, a prompt in the form of an electronic message may be displayed on a display of the audible interface device 390 if available or the user's smartphone in accordance with a predetermined communication address. User authentication may be perpetual or time-limited in which the authentication expires after a predetermined duration. Alternatively, the user may be prompted to authenticate himself/herself on an electronic device 400 such as a mobile phone of the user based on a designated communication address.

When the audible interface device 390 comprises a visual notification element, the alert instructions may include instructions to generate a visual alert via the visual notification element in accordance with the alert data provided in the alert instructions. For example, when the visual notification element of the audible interface device 390 comprises at least one LED, the visual alert may comprise flashing the at least one LED in a predetermined pattern in dependence on a characteristic of the event. When the at least one LED is a multi-color LED or a plurality of LEDs of more than one color (for example, in a strip), the visual alert may comprise flashing the LED in a predetermined color in dependence on a characteristic of the event. When the visual notification element of the audible interface device 390 comprises a display, the visual alert may comprise displaying on the display an electronic message comprising the alert data of the audible alert. The electronic message may comprise a deep link to a resource corresponding to the audible alert. A deep link may be a hyperlink (i.e. Uniform Resource Locator (URL)) that links to a specific web page or a specific section of a web page rather than a home page of a website of a browser-based web application, such as a banking website. Alternatively, the deep link may be a native application link to a specific page or screen of an application on the audible interface device 390, such as a banking application. The deep link, when selected or invoked, displays the page, screen or section of the browser-based web application or native application related to the audible alert. For example, if the audible alert relates to a change in account status to overdrawn, the deep link may be direct the audible interface device 390 to display an "Account History" or "Messaging" interface screen including information about the current account balance and overdrawn status, or to a "Transfer Funds" UI screen so that the overdrawn status can be addressed via a transfer of funds from a different account of the user. If the user has not been authenticated on the audible interface device 390, the user may be prompted to authenticate himself/herself on the audible interface device 390 before the electronic message can be displayed or the deep link can be accessed.

The processor of the audible interface device 390 may be configured to detect a command to defer to the generation of the audible alert. The command may be received as a voice input acquired by a speaker of the audible interface device 390 such as "Snooze for [x] minutes" where x is a number of minutes provided by the user. Alternatively, the command may be received as user input acquired via a touchscreen or other input device of the audible interface device 390. For example, if the audible interface device 390 has a display, an electronic message/notification corresponding to the audible alert may be displayed contemporaneously with the audible alert. The notification may be provided in a notification dialog box that comprises a plurality of buttons which include a deep link and/or open button (designated by "Open") for viewing the details of the event, a defer button (designated by "Snooze") for deferring the notification to a new time and/or date, and a dismiss button (designated by "Dismiss") for dismissing the notification. In response to detection of the command to defer to the generation of the audible alert, the processor of the audible interface device 390 may defer the generation of the audible alert for a predetermined duration. In this way, audible alerts may have a delay alert/snooze functionality.

At operation 512, the processor 352 may also send an electronic message, such as an email, comprising the alert data of the audible alert to a predetermined communication address. The electronic message may comprise a deep link to a resource corresponding to the audible alert. The electronic message may be sent to the predetermined communication address contemporaneously with sending the alert instructions to the audible alert device 390 in operation 508.

Figure 4:
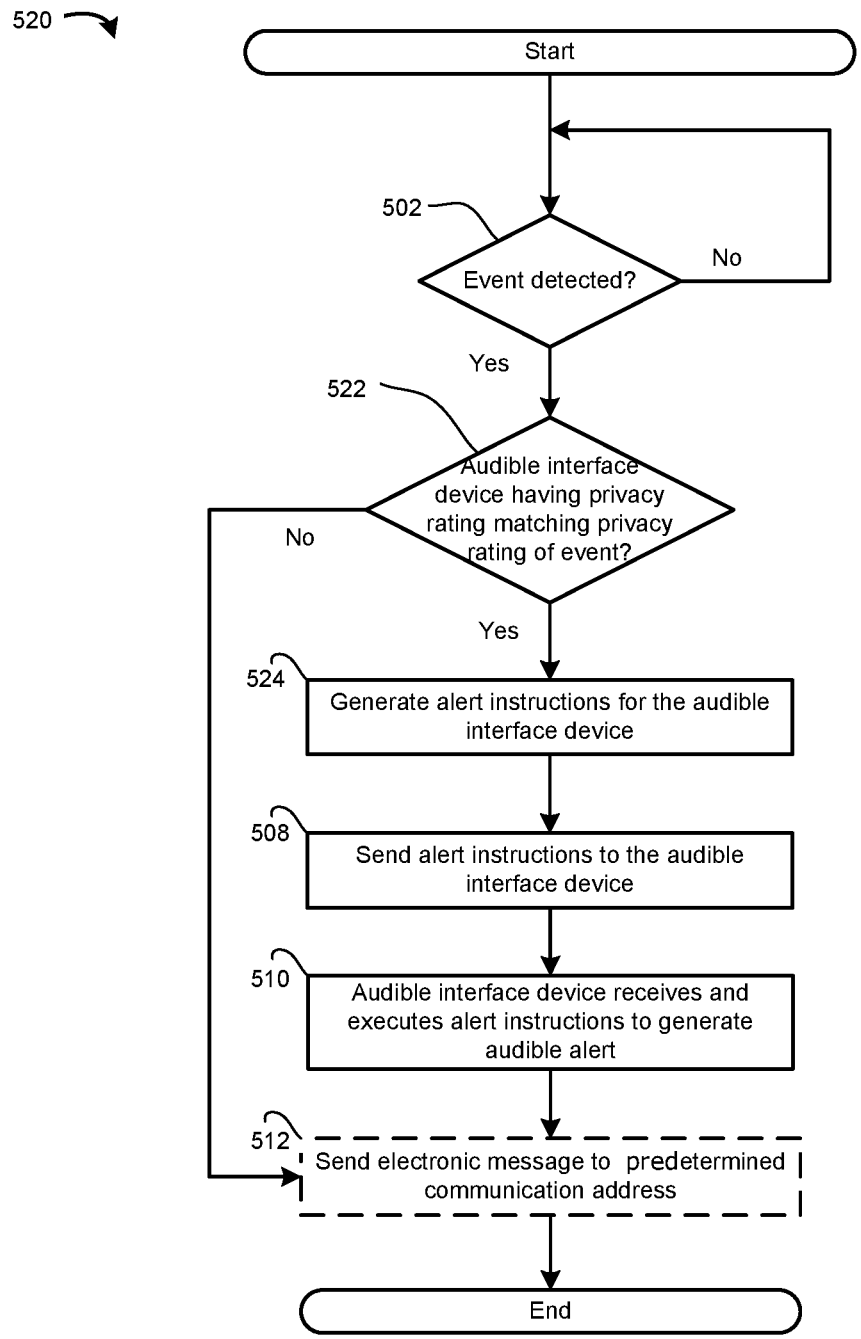
FIG. 4 is a flowchart illustrating a method of delivering audible alerts on an audible interface device in accordance with another example embodiment of the present disclosure.

Referring next to FIG. 4, a method 520 of delivering audible alerts on an audible interface device in accordance with another example embodiment of the present disclosure will be described. The method 520 is performed at least in part by the web application server 315. The method 520 is similar to the method 500 but differs in that the audible alert is delivered to an audible alert device based on a privacy rating of the event triggering the audible alert and a privacy rating of the audible alert device rather than the audible alert device closest to the user.

At operation 502, the processor 352 of the web application server 315 monitors for and detects events for generating an audible alert for a user. When the processor 352 detects an event for generating an audible alert for a user, operations proceed to operation 504. Otherwise, the processor 352 continues to monitor for events for generating an audible alert for a user or until the operations of the method are terminated.

At operation 522, in response to detection of the event for generating the audible alert, the processor 352 determines one or more authorized audible interface devices 390 for generating an audible alert having a privacy rating that matches a privacy rating of the event. The privacy ratings may be bimodal, such as "private" or "non-private" in some embodiments. As preliminary steps, the privacy rating of the authorized audible interface devices 390 are determined by the privacy module 364 and the privacy rating of the event is determined from the event data provided by the resource server API 335.

A context setting for the authorized audible interface devices 390 may be used in addition to, or instead of, a privacy rating when determining the authorized audible interface devices 390 to which the audible alert is to be delivered. The context setting may define whether to receive audible alerts at all, and if so, which types. The types of audible alerts may be based on a privacy rating of the audible alerts, priority rating of the event, or both. For example, high priority alerts such as alerts triggered by detection of fraudulent or potentially fraudulent activity may be enabled for audible interface devices 390 in the user's office, car, and home. In contrast, lower priority alerts such as missing a bill due date may be enable for audible interface devices 390 in the use's home and car, whereas low priory alerts such as a user's monthly spend on coffee may be enable for audible interface devices 390 in the use's home only.

At operation 524, the processor 352 generates alert instructions for an audible interface device 390 via the audible interface module 356 based on alert data. The alert instructions are configured to cause the audible interface device 390 to generate the audible alert in accordance with the alert data provided in the alert instructions. The alert instructions may specify a type and characteristics of the audible alert whereas the alert data may specify the content of the audible alert.

The alert module 360 may generate the alert data dynamically based on the event data and optionally other factors such as the privacy of the environment of the audible interface device 390 to which the audible alert is to be delivered and user settings. For example, non-verbal sounds (e.g., ping or tone) may be used when the environment of the audible interface device 390 is determined to be non-private whereas a verbal (voice message) with details about the detected event may be used when the environment of the audible interface device 390 is determined to be private. Alternatively, the alert data may be previously generated by the alert module 360 in response to detection of the event, for example, when the privacy of the environment of the audible interface device 390 to which the audible alert is to be delivered is already known.

At operation 508, the communication module 354 sends the alert instructions to the one or more audible interface devices 390 over the wireless network via the communication module in response to instructions by the processor 352.

At operation 510, the communications module 225/420 of the one or more audible alert devices 390 receive the alert instructions and executes the alert instructions, thereby causing the one or more audible interface devices 390 to generate the audible alert. The audible interface devices 390 may generate the audible alert at a particular notification frequency until input dismissing or deferring the audible alert is received by the audible interface device, as described above.

Figure 5A:
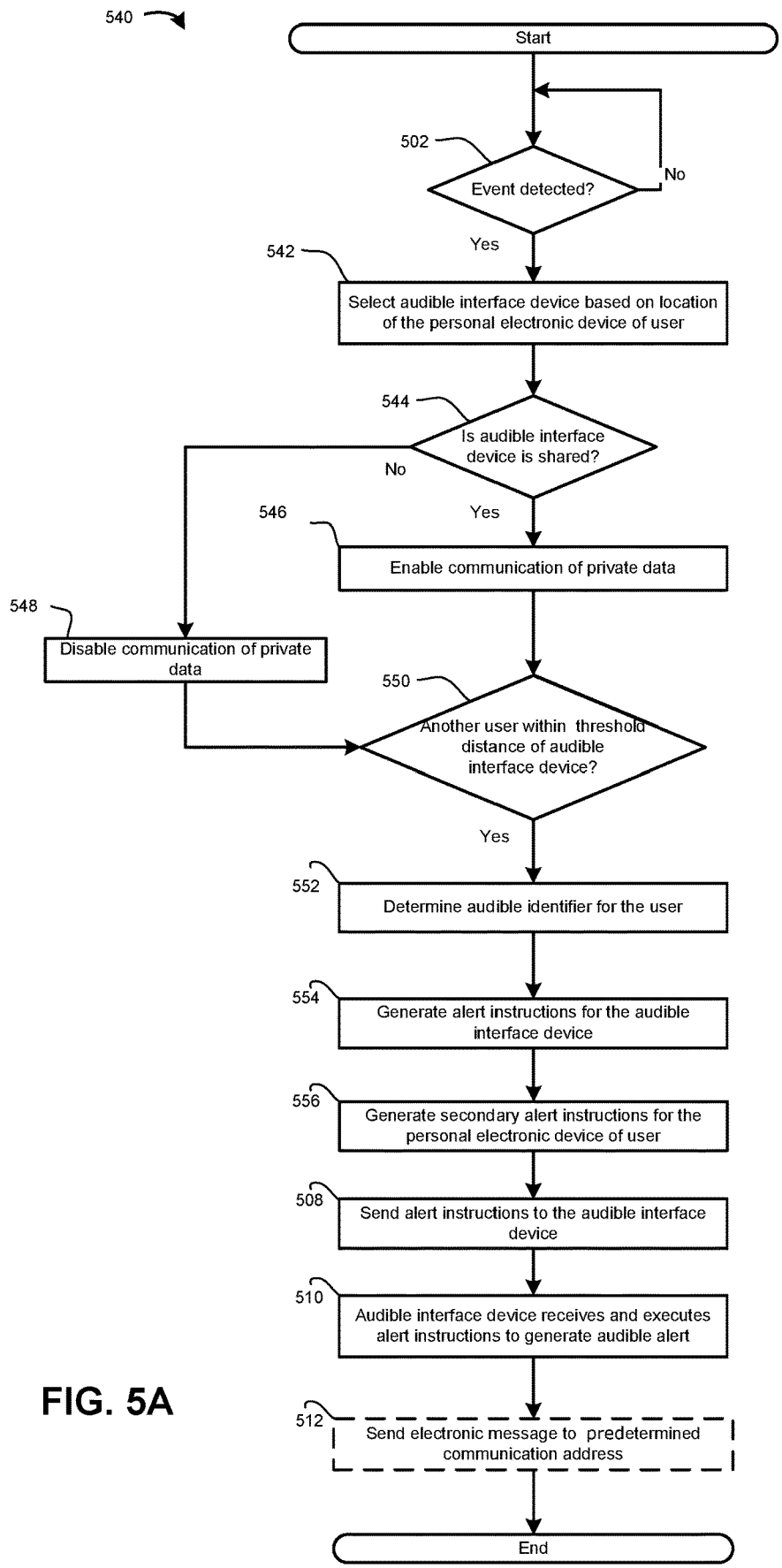
FIG. 5A-5D are flowcharts illustrating a method of delivering audible alerts on an audible interface device in accordance with further example embodiments of the present disclosure.

At operation 512, the processor 352 may also send an electronic message, such as an email, comprising the alert data of the audible alert to a predetermined communication address Referring next to FIG. 5A, a method 540 of delivering audible alerts on an audible interface device in accordance with a further example embodiment of the present disclosure will be described. The method 540 is performed at least in part by the web application server 315. At operation 502, the processor 352 of the web application server 315 monitors for and detects events for generating an audible alert for a user.

At operation 542, in response to detection of the event for generating the audible alert, the processor 352 selects an audible interface device 390 for delivery of the audible alert based on a location of a personal electronic device of the user. As noted above, the personal electronic device may be a wearable electronic device worn or carried by the user.

At operation 544, the processor 352 determines whether the selected audible interface device is shared. This determined is based on authorization information maintained by the web application server 315.

At operation 546, in response to determining that the selected audible interface device 390 is shared, the communication of private data is enabled. The shared status of the audible interface device 390 means that private data may be communicated. For the selected audible interface device 390 to be shared and the communication of private data to be enabled, authorization and/or authentication is obtained by the authorization server API 325 during a setup or configuration mode.

At operation 546, in response to determining that the selected audible interface device 390 is not shared, the communication of private data is disabled. When the communication of private data is disabled, the web application server 315 disables the audible interface module 356 from generating an audible alert comprising a verbal message containing private data. When disabling the audible interface module 356 from generating an audible alert comprising a verbal message containing private data, the audible alert may comprise a non-verbal sound. When disabling the audible interface module 356 from generating an audible alert comprising a verbal message containing private data, the audible alert may comprise a verbal message containing a predetermined phrase containing non-private data determined during generation of the alert instructions in dependence on the event.

At operation 550, the processor 352 determines whether a personal electronic device of another user is within a threshold distance of the selected audible interface device 390. This determination may be made by the location module 358 based on location information. The personal electronic device of the other users may be a wearable electronic device worn or carried by the respective user. The location of the personal electronic device of each respective user authorized to use the selected audible interface device 390 is determined by the web application server 315. The location of the personal electronic device of each respective user authorized to use the selected audible interface device 390 is determined by querying a location service, the selected audible interface device 390, the personal electronic device of each respective user, or a proxy device which provides location information on behalf of the selected audible interface device 390 or the personal electronic device of each respective user.

At operation 552, in response to determining that the personal electronic device of another user is within the threshold distance of the selected audible interface device 390, the processor 352 determines an audible identifier associated with the user. The audible identifier may be a non-verbal sound or a verbal message in the form of a user indicator. The user indicator may be a user name of the user for whom the audible alert is directed.

To determine an audible identifier associated with the user, the web application server 315 may query the audible identifier database of the audible interface module 356 to identify the audible identifier associated with the user, and retrieve the audible identifier associated with the user. The audible identifier database comprises a plurality of user-defined audible identifiers, one user-defined audible identifier for each authorized user.

At operation 554, the processor 352 generates alert instructions for the selected audible interface device 390 via the audible interface module 356 based on alert data. The alert instructions are configured to cause the audible interface device 390 to generate the audible alert in accordance with the alert data provided in the alert instructions such that the generation of the audible alert is preceded by generation of the audible identifier associated with the user to notify the user of the forthcoming audible alert. The alert instructions may specify a type and characteristics of the audible alert whereas the alert data may specify the content of the audible alert. One or more of a type, content or characteristics of the audible alert may depend on a characteristic of the event. The characteristic of the event may be a priority rating assigned to the event.

At operation 556, the processor 352 may optionally generate secondary alert instructions for a personal electronic device of the user. The secondary alert instructions cause the personal electronic device to generate a secondary alert in accordance with alert data provided in the secondary alert instructions via a notification element of the personal electronic device. The secondary alert may be customized for the user based on pre-defined user settings stored by the web application server 315 for the user. For example, the web application server 315 may comprise secondary alert settings for each user that shares the audible interface device 390. The secondary alert may comprise a visual alert such as a notification (message, icon splash, etc.) displayed on a display screen of the personal electronic device or a notification generated by flashing an LED, an audible alert such as a ping, tone or other sound generated by a speaker of the personal electronic device, or a physical alert generated by a vibrator or like. The secondary alert settings may define a type, content and/or characterise (e.g., pattern) of the secondary alert. In one example, the notification element may comprise a vibrator and the secondary alert may comprise a vibration caused by the notification element. In another example, the notification element may comprise at least one LED and the secondary alert may comprise flashing of the LED. In a further example, the notification element may comprise a display and the secondary alert may comprise displaying on the display an electronic message comprising the alert data of the audible alert. The electronic message may comprise a deep link to a resource corresponding to the audible alert.

At operation 508, the communication module 354 sends the alert instructions to the selected audible interface device 390 over the wireless network via the communication module in response to instructions by the processor 352. When secondary alert instructions are generated, the secondary alert instructions are sent to the personal electronic device over the wireless network via the communication module. The secondary alert instructions are sent contemporaneously with sending the audible alert instructions to the audible alert device 390 so that the audible alert instructions and secondary alert instructions are received contemporaneously by the respective devices so that the audible alert and secondary alert may be generated contemporaneously by the respective receiving devices.

At operation 510, the communications module 225/420 of the audible alert device 390 receives the alert instructions and executes the alert instructions, thereby causing the audible interface device 390 to generate the audible alert. The generation of the audible alert is preceded by generation of the audible identifier associated with the user to notify the user of the forthcoming audible alert. The audible interface device 390 may generate the audible alert at a notification frequency until input dismissing or deferring the audible alert is received by the audible interface device.

At operation 512, the processor 352 may also send an electronic message, such as an email, comprising the alert data of the audible alert to a predetermined communication address. The electronic message may comprise a deep link to a resource corresponding to the audible alert. The electronic message may be sent to the predetermined communication address contemporaneously with sending the alert instructions to the audible alert device 390 and secondary alert instructions.

Figure 5B:
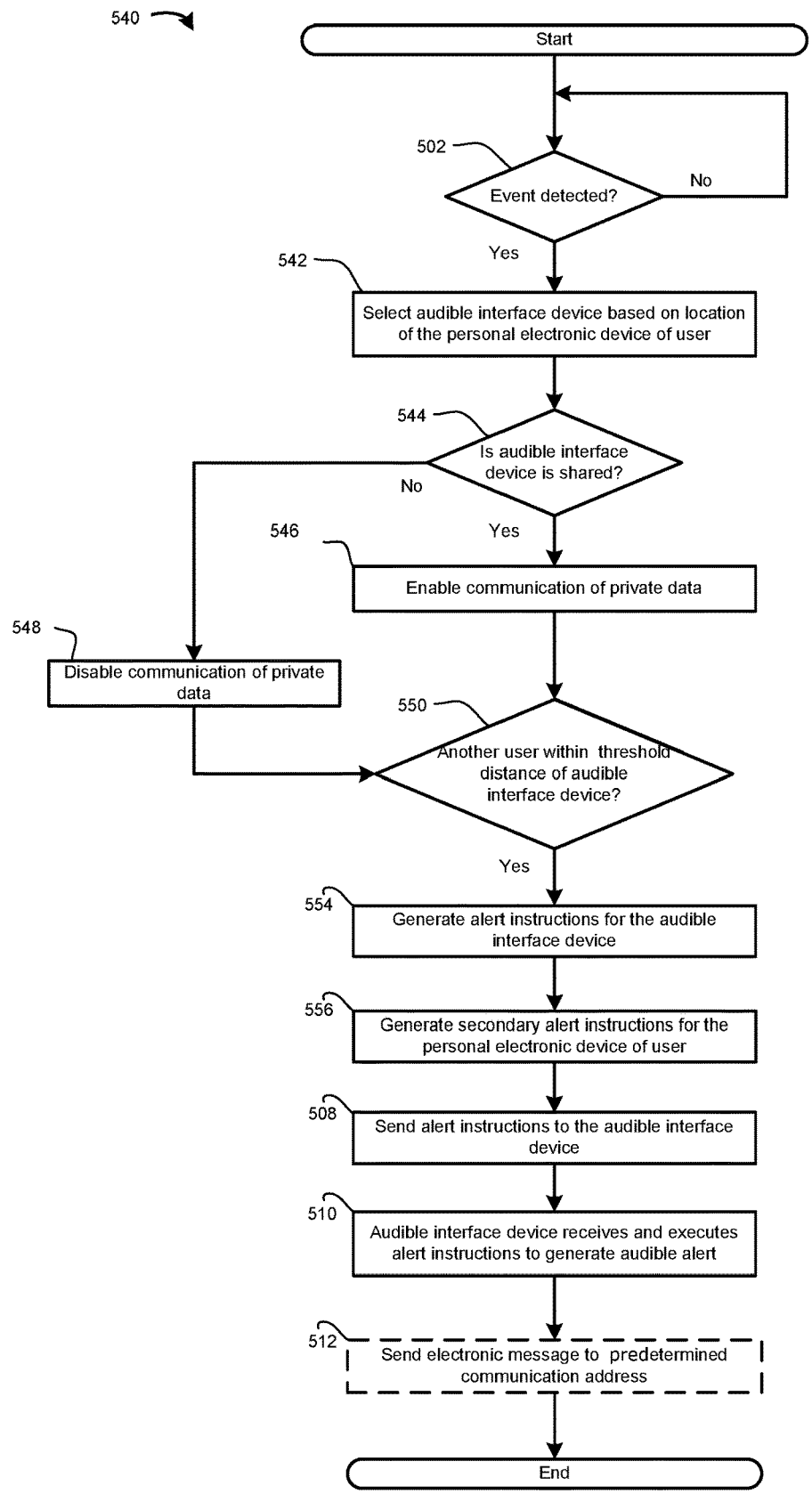

Referring next to FIG. 5B, a method 560 of delivering audible alerts on an audible interface device in accordance with a further example embodiment of the present disclosure will be described. The method 560 is performed at least in part by the web application server 315. The method 560 is similar to the method 540 described above in connection with FIG. 5A with the notable difference that audible identifiers are omitted. Instead, secondary alerts sent to the personal electronic device of the user are used to differentiate the user to whom the audible alert is directed.

Figure 5C:
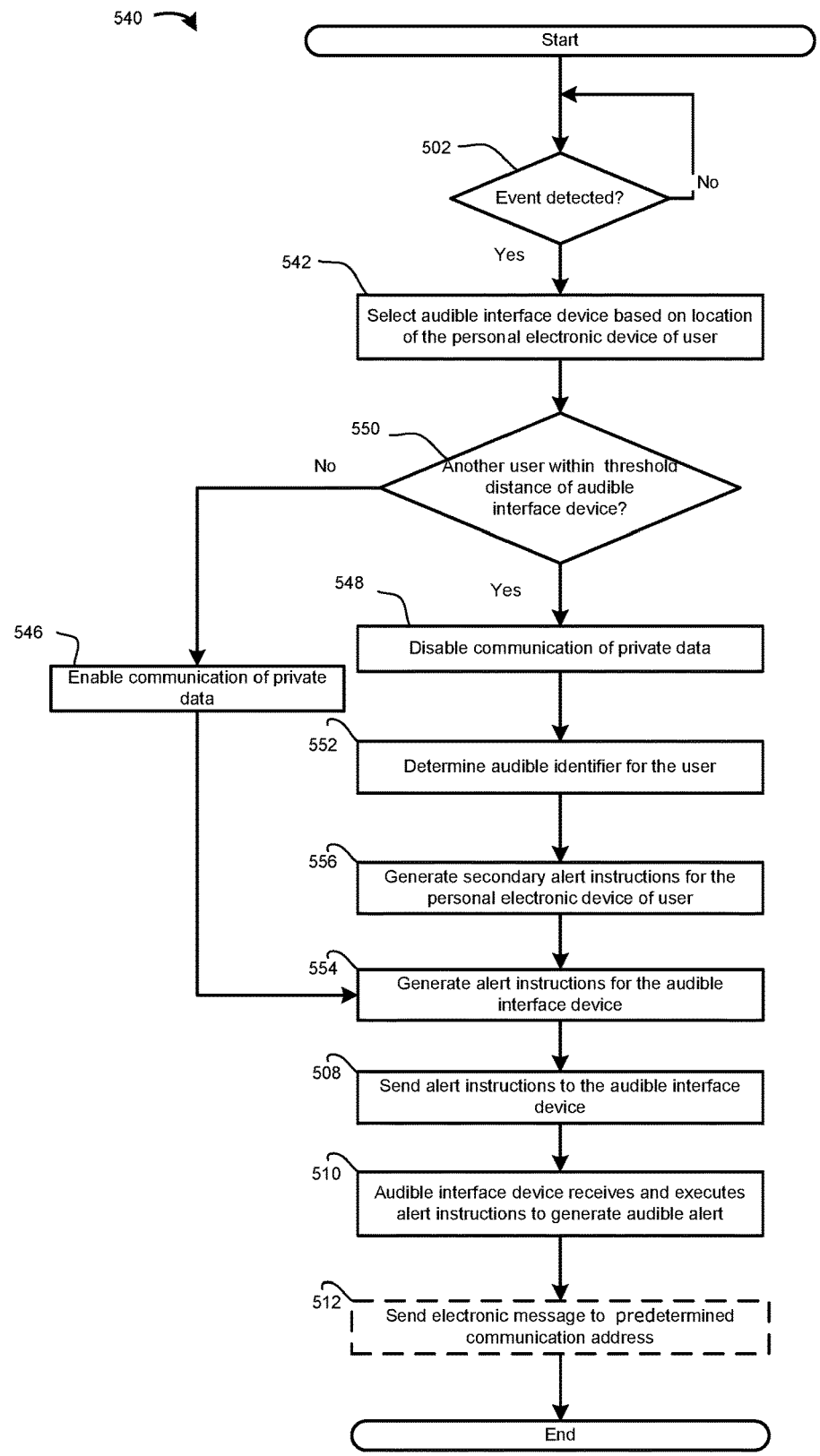

Referring next to FIG. 5C, a method 570 of delivering audible alerts on an audible interface device in accordance with a further example embodiment of the present disclosure will be described. The method 570 is performed at least in part by the web application server 315. The method 570 is similar to the methods 540 and 560 described above in connection with FIGS. 5A and 5B with the notable difference that the processor 352 does not determine whether the selected audible interface device is shared. Instead, the determination as to whether the communication of private data is enabled is based on whether a personal electronic device of another user is within a threshold distance of the selected audible interface device 390.

Figure 5D:
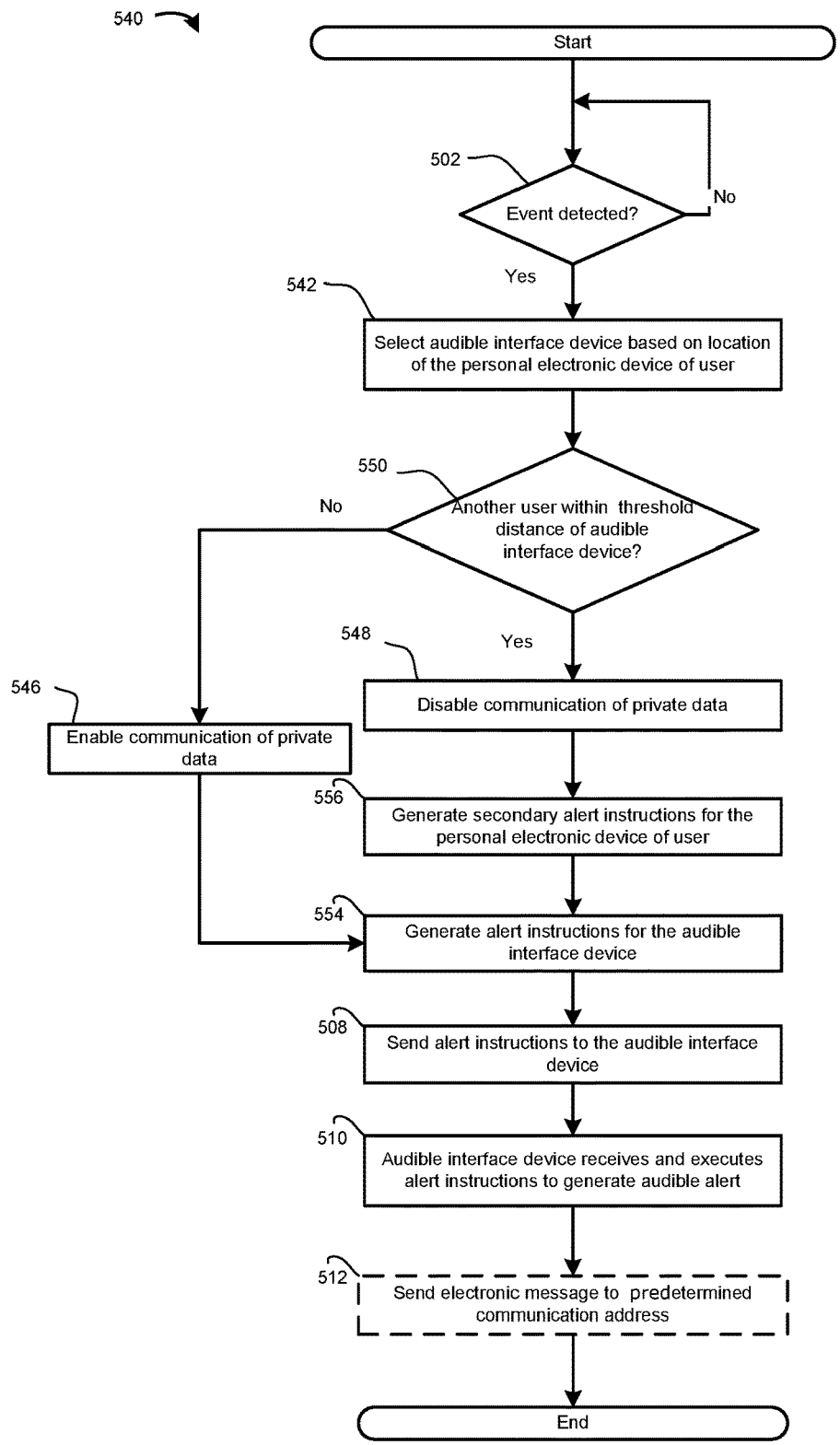

Referring next to FIG. 5D, a method 580 of delivering audible alerts on an audible interface device in accordance with a further example embodiment of the present disclosure will be described. The method 580 is performed at least in part by the web application server 315. The method 580 is similar to the method 570 described above in connection with FIG. 5C with the notable difference that the user of audible identifiers is omitted. Instead, secondary alerts sent to the personal electronic device of the user are used to differentiate the user to whom the audible alert is directed.

The methods 540, 560, 570 and 580 provide methods of delivering audible alerts when multiple users are in the environment of an audible interface device 390 by customizing the alert for the particular user. The audible alert is preceded or pre-fixed with a user indicator such as the user's name, or a user specific ping, tone or ring. Different audible identifiers, such as different pings, are used for different users for alerts on a shared audible interface device, such as a shared smart speaker, in a home. When the web application server 315 determines that multiple people/users are near the audible interface device 390, the audible interface device 390 will use a different ping to identify the particular user that the alert is intended for. Alternatively, when multiple people/users are near the audible interface device 390, an undifferentiated ping or other non-verbal sound may be used and a secondary alert may be generated on a personal electronic device of the particular user for which the alert is intended. For example, the personal electronic device of the particular user for which the alert is intended may be vibrated at the same time as the audible alert to identify the particular user that the alert is intended for. The secondary alert may be customized for the particular user as described above.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine readable code executable by one or more processors of one or more respective devices to perform the above-described method may be stored in a machine readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A server, comprising:
a processor;
a communication subsystem coupled to the processor for communication with a wireless network;
a memory coupled to the processor, the memory having tangibly stored thereon executable instructions for execution by the processor, wherein the executable instructions, when executed by the processor, cause the server to:
monitor financial data for events for generating an audible alert for a user, wherein monitored financial data comprises data transfers and banking data associated with the user, wherein events which generate an audible alert for the user are a subset of detectable events predesignated from a set of detectable events;
detect, from the monitored financial data, an event for generating an audible alert for the user;
in response to detection of the event for generating the audible alert:
determine whether an authorized audible interface device is within a threshold distance of the user based on a location of the user and a location of one or more authorized audible interface devices;
in response to a determination that an audible interface device is within the threshold distance of the user, generate alert instructions for the audible interface device based on the monitored financial data, wherein the alert instructions cause the audible interface device to generate the audible alert in accordance with alert data provided in the alert instructions, and send the alert instructions to the audible interface device over the wireless network via the communication subsystem; and
in response to a determination that an audible interface device is not within the threshold distance of the user, refrain from causing the generation of the audible alert for a user, and send an electronic message to a predetermined communication address, wherein the electronic message comprises the alert data of the audible alert.

2. The server of claim 1, wherein the location of the user is determined by determining a location associated with a personal electronic device of the user.

3. The server of claim 2, wherein the personal electronic device is a wearable electronic device adapted to be worn or carried by the user.

4. The server of claim 1, wherein the determining whether an authorized audible interface device is within the threshold distance of the user is performed by querying a location service, the audible interface device, a personal electronic device of the user, or a proxy device which provides location information on behalf of the audible interface device or the personal electronic device of the user.

5. The server of claim 1, wherein the determining whether an authorized audible interface device is within the threshold distance of the user is performed by the server.

6. The server of claim 1, wherein the alert instructions cause the audible interface device to generate the audible alert until input dismissing or deferring the audible alert is received by the audible interface device.

7. The server of claim 1, wherein the alert instructions cause the audible interface device to:
generate the audible alert;
detect a command to defer to the generation of the audible alert; and
in response to detection of the command to defer to the generation of the audible alert, defer the generation of the audible alert for a predetermined duration.

8. The server of claim 1, wherein one or more of a type, content or characteristic of the audible alert depends on a characteristic of the event.

9. The server of claim 8, wherein the characteristic of the event is a priority rating assigned to the event.

10. The server of claim 1, wherein the event is a data transfer, a change in a status of an account of the user, or receipt of an electronic message.

11. The server of claim 8, wherein the characteristics of the audible alert comprises one or more of audio characteristics or a notification frequency at which the alert is generated,
wherein the audio characteristics comprise one or more of a pitch or amplitude.

12. The server of claim 8, wherein the types of audible alerts comprise verbal messages and non-verbal sounds.

13. The server of claim 1, wherein the executable instructions, when executed by the processor, further cause the server to:
determine whether an environment of the audible interface device is private;
in response to a determination that the environment of the audible interface device is private, enable the server to generate an audible alert comprising a verbal message containing private data;
in response to a determination that the environment of the audible interface device is non-private, disable the server from generating an audible alert comprising a verbal message containing private data.

14. The server of claim 13, wherein, when disabling the server from generating an audible alert comprising a verbal message containing private data, the audible alert comprises a non-verbal sound.

15. The server of claim 13, wherein, when disabling the server from generating an audible alert comprising a verbal message containing private data, the audible alert comprises a verbal message containing a predetermined phrase containing non-private data determined during generation of the alert instructions in dependence on the event.

16. The server of claim 1, wherein the alert instructions are sent to an audible interface device closest to the user when more than one audible interface device is within the threshold distance of the user.

17. The server of claim 1, wherein, when the audible interface device comprises at least one light emitting diode (LED), the alert instructions include instructions to generate a visual alert via the LED in accordance with the alert data provided in the alert instructions, wherein the visual alert comprises flashing the LED in a predetermined color and/or pattern in dependence on a characteristic of the event.

18. The server of claim 1, wherein, when the audible interface device comprises a display, the alert instructions include instructions to generate a visual alert via the display in accordance with the alert data provided in the alert instructions, wherein the visual alert comprises displaying on the display an electronic message comprising the alert data of the audible alert, wherein the electronic message comprises a deep link to a resource corresponding to the audible alert.

19. A server, comprising:
a processor;
a communication subsystem coupled to the processor for communication with a wireless network;
a memory coupled to the processor, the memory having tangibly stored thereon executable instructions for execution by the processor, wherein the executable instructions, when executed by the processor, cause the server to:
monitor financial data for events for generating an audible alert for a user, wherein monitored financial data comprises data transfers and banking data associated with the user, wherein events which generate an audible alert for the user are a subset of detectable events predesignated from a set of detectable events;
detect, from the monitored financial data, an event for generating an audible alert for the user;
in response to detection of the event for generating the audible alert:
determine whether one or more authorized audible interface devices for generating the audible alert having at least one of a privacy rating match a privacy rating of the event and a context setting and that match a priority rating of the detected event;
in response to a determination that one or more matching authorized audible interface devices exist:
generate alert instructions for the one or more authorized audible interface devices based on the monitored financial data, wherein the alert instructions cause the one or more authorized audible interface devices to generate the audible alert in accordance with alert data provided in the alert instructions; and
send the alert instructions to the one or more audible interface devices over the wireless network via the communication subsystem; and
in response to a determination that one or more matching authorized audible interface devices do not exist, refrain from causing the generation of the audible alert for a user, and send an electronic message to a predetermined communication address, wherein the electronic message comprises the alert data of the audible alert.

* * * * *